United States Patent [19]

Miesterfeld et al.

[11] Patent Number: 4,739,323
[45] Date of Patent: Apr. 19, 1988

[54] SERIAL DATA BUS FOR SERIAL COMMUNICATION INTERFACE (SCI), SERIAL PERIPHERAL INTERFACE (SPI) AND BUFFERED SPI MODES OF OPERATION

[75] Inventors: Frederick O. R. Miesterfeld, Troy; John M. McCambridge, Northville; Ronald E. Fassnacht, Rochester; Jerry M. Nasiadka, Warren, all of Mich.

[73] Assignee: Chrysler Motors Corporation, Highland Park, Mich.

[21] Appl. No.: 866,629

[22] Filed: May 22, 1986

[51] Int. Cl.[4] .............................................. H04Q 9/00
[52] U.S. Cl. ..................................... 340/825.5; 370/85
[58] Field of Search ......................... 340/825.8, 825.51; 370/85

[56] References Cited

U.S. PATENT DOCUMENTS

| | | | |
|---|---|---|---|
| 4,281,380 | 7/1981 | Demesa, III et al. | 370/94 |
| 4,409,592 | 10/1983 | Hunt | 340/825.5 |
| 4,429,384 | 1/1984 | Kaplinsky | 370/85 |
| 4,434,421 | 2/1984 | Baker et al. | 340/825.51 |
| 4,470,110 | 9/1984 | Chiarottino et al. | 370/85 |
| 4,472,712 | 9/1984 | Ault et al. | 340/825.5 |
| 4,628,311 | 12/1986 | Milling | 340/825.5 |

OTHER PUBLICATIONS

IEEE publication "Automotive Applications of Microprocessors", 1984; Paper No. CH2072-7/84/0000-0083, A Data Link for Agriculture and Off Highway Communications, by Boyd Nichols, Uijay Dharia and Kanaparty Rao.
SAE Information Report, "J1567 Collision Detection Serial Data Communications Multiplex Bus", Frederick O. R. Miesterfeld, May 23, 1986.
A. Bozzini, et al "Serial Bus Structures for Automotive Applications", SAE Technical Paper Series, 830536, Feb. 28–Mar. 4, 1983.
F. Miestefeld, "Chrysler Collision Detection (C[2]D)-A Revolutionary Vehicle Network", SAE Technical Paper Series, 860389, Feb. 24–28, 1986.
F. Phail et al, "In Vehicle Networking-Serial Communication Requirements and Directions", SAE Technical Paper Series, 860390, Feb. 24–28, 1986.
R. Mitchell, "A Small Area Network for Cars", 840317, SAE Technical Paper Series, 1984.

Primary Examiner—Donald J. Yusko
Attorney, Agent, or Firm—Mark P. Calcaterra

[57] ABSTRACT

The aim of the Chrysler Collision Detector (CCD) Bus System is to allow multiple microprocessors to easily communicate with each other over a common pair of wires (called a bus) using a scheme similar to a telephone party line. All microprocessors connected to the bus are able to receive all messages transmitted on the bus. Any microprocessor with a message to transmit on the bus waits until any current user is finished before attempting to use it. Whenever the bus is available, its use is allocated on a first-come, first serve basis (i.e., whichever microprocessor first begins transmitting its message on the bus after any previous message finishes gets the use of the bus). If, however, multiple microprocessors attempt to begin transmitting their messages on the bus at exactly the same time, then the message with the highest priority wins the use of the bus. All messages have unique message priority values and each message is transmitted by only one microprocessor. The subject invention provides the ability to communicate with a SCI port, a SPI port or a buffered SPI port. This allows communication with any device configured with any one of these ports, all on the same bus.

8 Claims, 15 Drawing Sheets

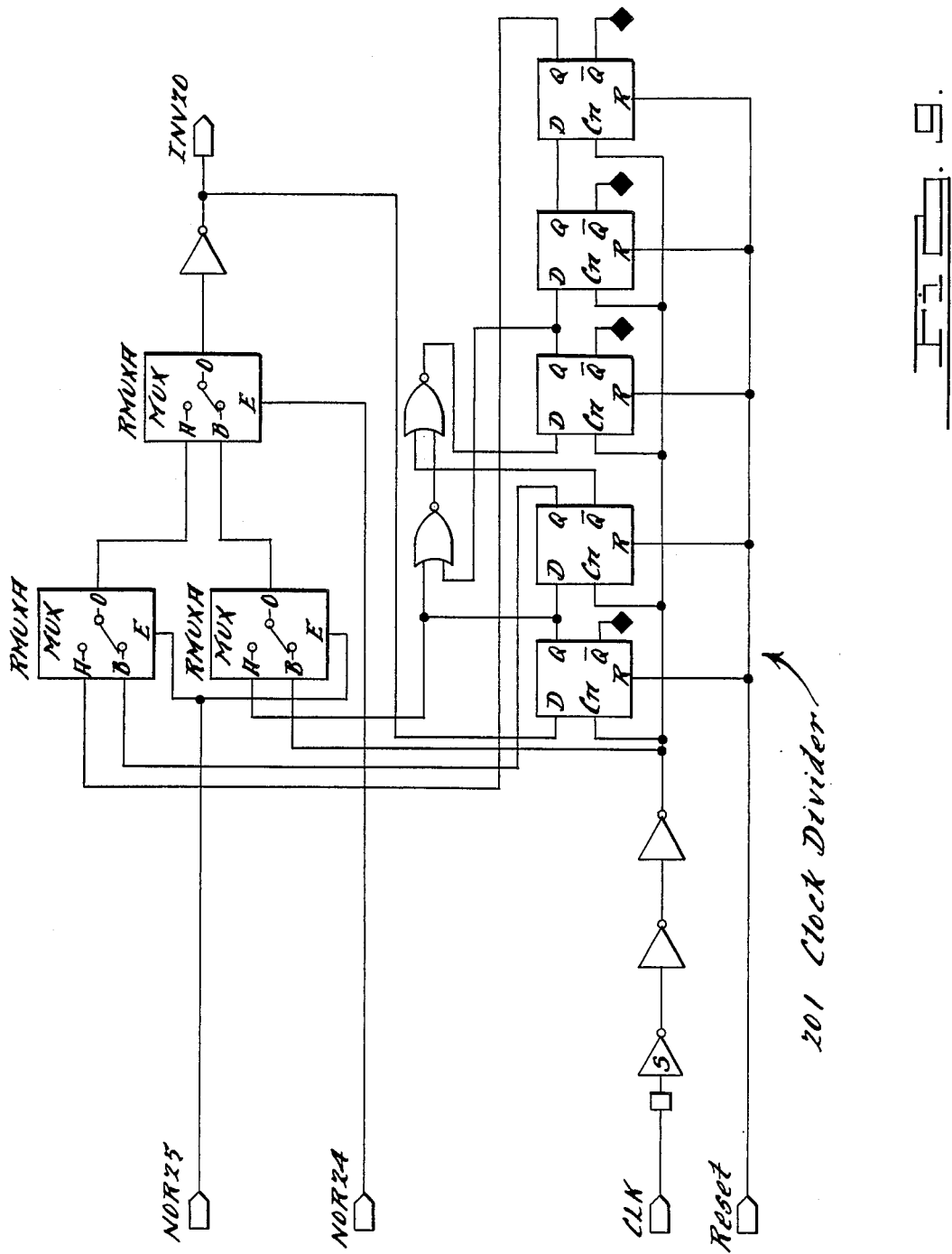

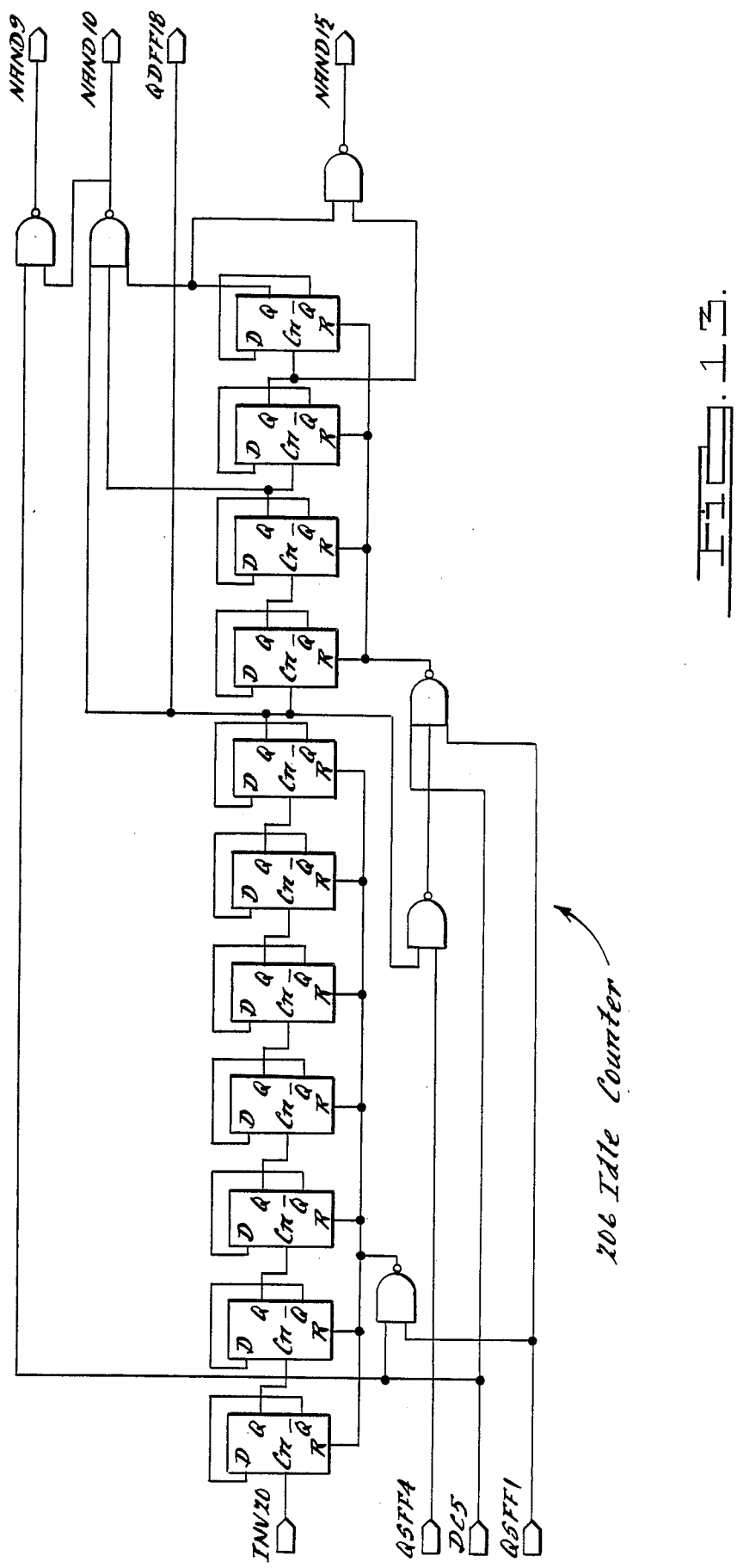

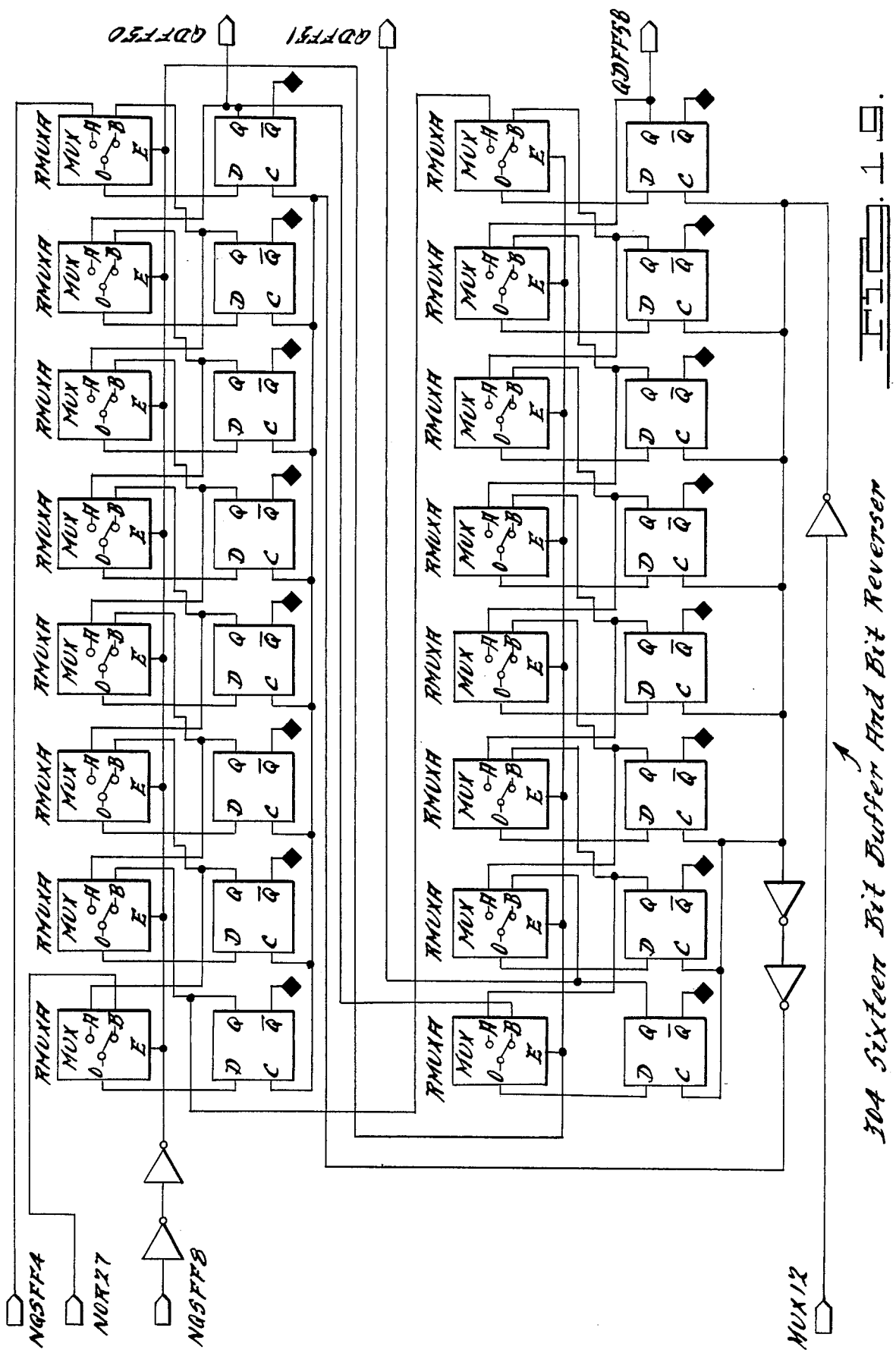

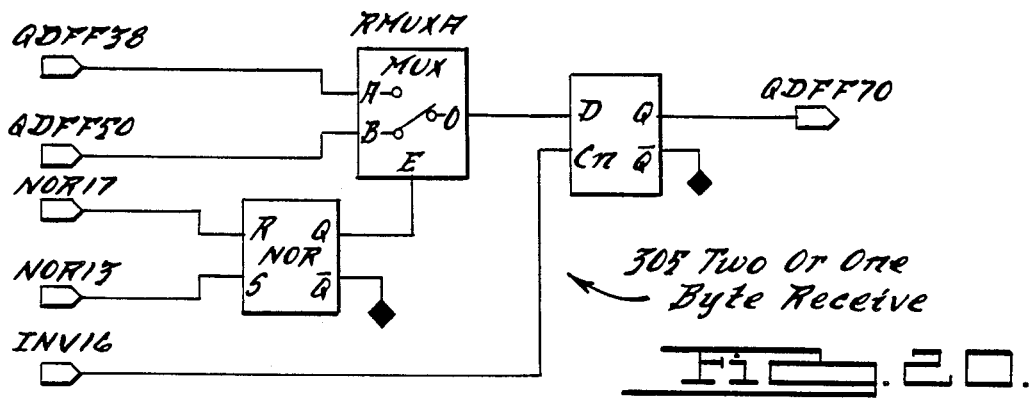
Fig. 20. 305 Two Or One Byte Receive
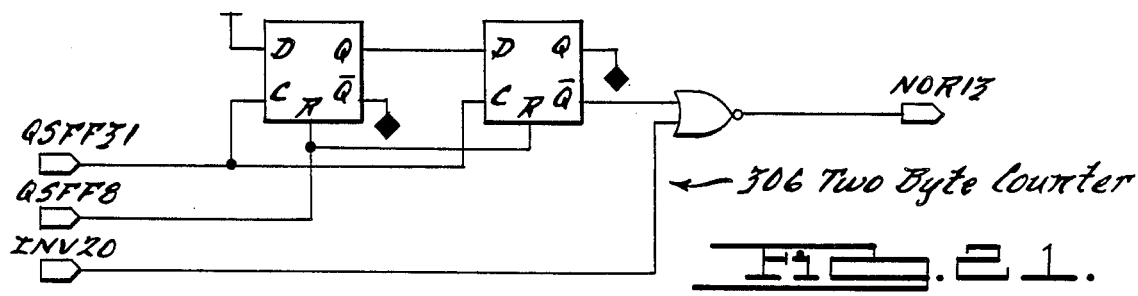
Fig. 21. 306 Two Byte Counter
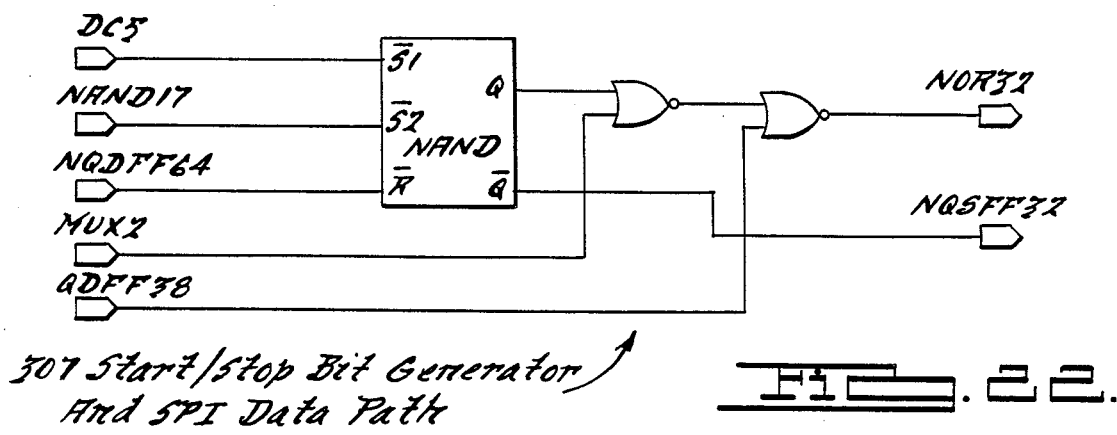
Fig. 22. 307 Start/Stop Bit Generator And SPI Data Path
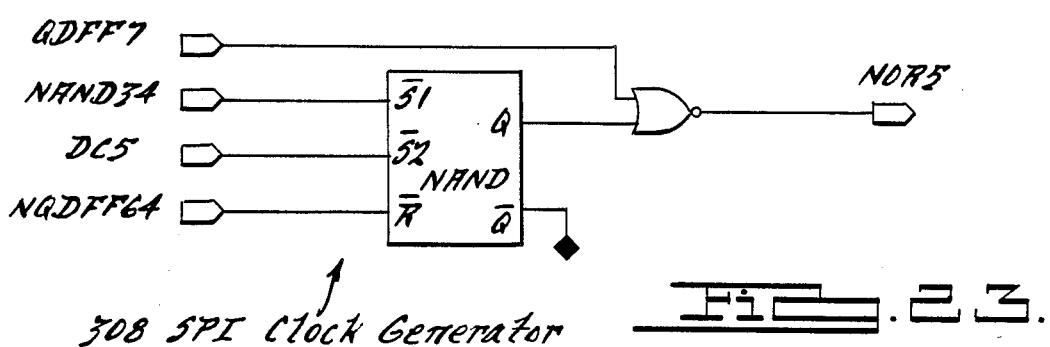
Fig. 23. 308 SPI Clock Generator

SERIAL DATA BUS FOR SERIAL COMMUNICATION INTERFACE (SCI), SERIAL PERIPHERAL INTERFACE (SPI) AND BUFFERED SPI MODES OF OPERATION

BACKGROUND OF THE INVENTION

1. Field of the Invention

The purpose of the disclosed serial data bus is to allow multiple microprocessors to easily communicate with each other over a common pair of wires using a scheme similar to a telephone party line. The invention relates to data communications links between members of a distributed processing multiplex system in a vehicle such as an automobile. The serial data bus and interface integrated circuit developed and disclosed herein is capable of supporting many types of communication protocols.

2. Description of the Prior Art

Data communications between microprocessors or microcomputers need to communicate with each other in many applications.

Local area networks (LAN) link such microprocessor or microcomputers, allowing one of the microcomputers to seize control of a serial data channel commonly linked to all other microprocessors on the LAN and transmit data to any other unit. The protocols, controllers and software needed in a LAN are very complex, especially in large systems.

An automotive environment is a smaller application and, thus, does not require the complex performance capabilities available in a LAN.

Digital data buses have been designed to handle the above-described data communications link in a small area. Such a system is described in SAE Paper No. 840317, by Ronald L. Mitchell entitled "A Small Area Network For Cars." This document is hereby expressly incorporated by reference. Also descriptive of such a digital data bus is U.S. Pat. No. 4,429,384 to Kaplinsky entitled "Communication System Having An Information Bus And Circuits Therefor."

Also descriptive of developments in this field is SAE Paper No. 860390 by Frederick H. Phail and David J. Arnett entitled "In Vehicle Networking—Serial Communications Requirements And Directions." This document is also hereby expressly incorporated by reference.

The subject invention differs from the art noted above by use of a constant speed, the lack of use of an acknowledgement bit and the lack of a requirements for a tight link between the transmitting station and the receiving stations. Also important in the subject invention is the communication link between the message transmitter and receiver.

Generally, the following U.S. patents discuss collision detection in data communications systems: U.S. Pat. No. 4,281,380 of DeMeas III et al. entitled "Bus Collision Avoidance System For Distributed Network Data Processing Communications System" dated July 28, 1981; U.S. Pat. No. 4,409,592 of V. Bruce Hunt entitled "Multipoint Packet Data Communication System Using Random Access And Collision Detection Techniques" dated Oct. 11, 1983; U.S. Pat. No. 4,434,421 of Baker et al. entitled "Method For Digital Data Transmission With Bit-Echoed Arbitration" dated Feb. 28, 1984; U.S. Pat. No. 4,470,110 of Chiarottino et al. entitled "System For Distributed Priority Arbitration Among Several Processing Units Competing For Access To A Common Data Channel" dated Sept. 4, 1984; and U.S. Pat. No. 4,472,712 of Ault et al. entitled "Multipoint Data Communication System With Local Arbitration" dated Sept. 18, 1984.

The U.S. Pat. No. 4,434,421 patent to Baker et al. deals with a method to reduce the number of collisions. This is done by reducing the number of slave stations attempting bus access until there is one master and one slave station in communication. This differs from the subject invention in that a broadcast method is employed whereby several users can receive the same message.

The U.S. Pat. No. 4,470,110 to Chiarottino et al. discloses a system to exchange messages including an interface. In addition, the '110 patent assigns a priority to an address bit of a particular logical level.

Also of interest is an article in an IEEE publication "Automotive Applications of Microprocessors,"1984; Paper No. CH2072-7/84/0000-0083 entitled "A Data Link For Agricultural And Off Highway Communications" by Boyd Nichols, Vijay Dharia and Kanaparty Rao.

Of paramount importance in the subject invention is the inclusion of the capability to communicate with a serial communication interface (SCI) port, a serial peripheral interface (SPI) port and a buffered serial peripheral interface (BSPI) port.

SUMMARY OF THE INVENTION

The purpose of the serial data bus system disclosed herein, also known as Chrysler Collision Detection ($C^2D$) bus, is to allow multiple microprocessors to easily communicate with each other over a common pair of wires or bus using a scheme similar to a telephone party line. All microprocessors connectred to the bus are able to receive all messages transmitted on the bus. Any microprocessor with a message to transmit on the bus waits until any current user is finished before attempting to use it.

Whenever the bus is available, its use is allocated on a first-come first-serve basis. That is, whichever microprocessor begins transmitting its message on the bus, after any previous message finishes, gets the use of the bus. If, however, multiple microprocessors attempt to begin transmitting their messages on the bus at exactly the same time, then the message priority values and each message is transmitted by only one microprocessor.

The invention disclosed herein is further summarized in two co-pending patent applications on related material. Both applications were filed in the U.S. Patent & Trademark Office on Feb. 24, 1986, and are commonly owned with the subject patent application. They are: "Serial Data Bus For Intermodule Data Communications," U.S. Ser. No. 832,908; and "Method Of Data Arbitration and Collision Detection On A Data Bus," U.S. Ser. No. 832,909. Both of these applications are hereby expressly incorporated by reference.

Also hereby expressly incorporated by reference is SAE Information Report entitled "J1567 Collision Detection Serial Data Communications Multiplex Bus" to be presented to the SAE Multiplexing Committee by Frederick O. R. Miesterfeld on May 23, 1986.

Attention is invited to the above-described applications for further explanation of the summaries of some of the basics of the invention described in the subject application.

It is an object of the subject invention to provide an SCI port, an SPI port and a buffered SPI port as part of the serial data interface integrated circuit described herein. This allows communication with any device configured with any one of these three ports all on the same bus. The inclusion of the ports augments the simplification of the serial data communication described in the previously filed patent applications on the related subject matter.

DESCRIPTION OF THE DRAWINGS

Other objects, features and advantages of the present invention will become more fully apparent from the following detailed description of the preferred embodiment, the appended claims and in the accompanying drawings in which:

FIG. 9 is a gate diagram of a clock divider 201;

FIG. 13 is a gate diagram of idle counter 206;

FIG. 19 is a gate diagram of a 16-bit buffer and bit reverser 304;

FIG. 20 is a gate diagram of a 2 or 1 byte receive 305;

FIG. 21 is a gate diagram of a 2 byte counter 306;

FIG. 22 is a gate diagram of a start/stop bit generator and SPI data path 307;

FIG. 23 is a gate diagram of SPI clock generator 308;

DETAILED DESCRIPTION OF THE PREFERRED EMBODIMENT

Figure 1:
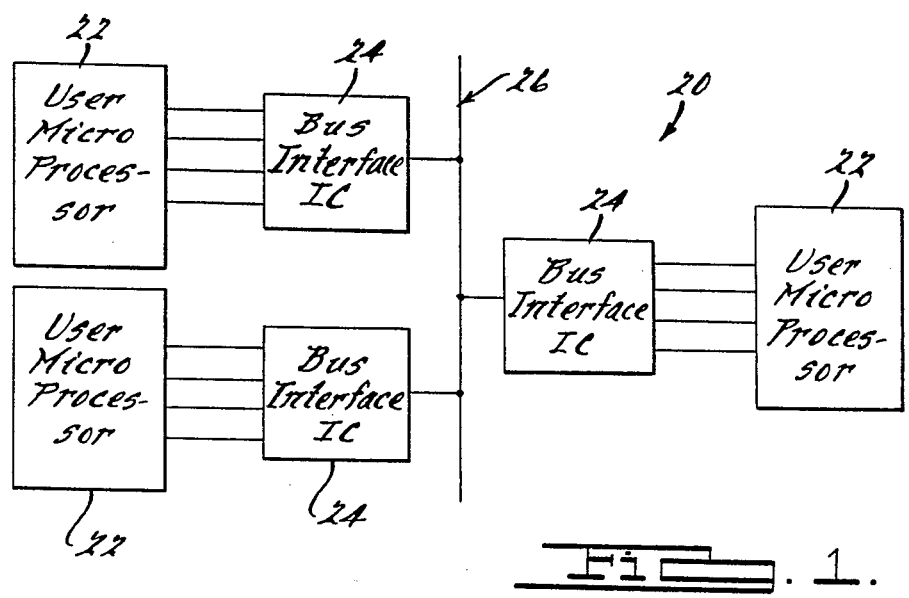
FIG. 1 is a block diagram showing a serial data bus network.

This application is one of three filed on the same day and having related specifications and drawings. The other cases are commonly owned with the same inventors are Ser. Nos. 866621 and 866628 and are entitled "Method For Serial Peripheral Interface In A Serial Data Bus" and "Method For A Buffered Serial Peripheral Interface In A Serial Data Bus." Both of these cases are hereby expressly incorporated by reference.

Further documents hereby expressly incorporated by reference include U.S. Pat. No. 4,429,384 issued to Kaplinsky and entitled "Communication System Having An Information Bus And Circuits Therefor"; SAE Technical Paper No. 830536 entitled "Serial Bus Structures For Automotive Applications" by Anthony J. Bozzini and Alex Goldberger dated Feb. 28, 1983; SAE Paper No. 840317 by Ronald L. Mitchell entitled "A Small Area Network For Cars"; SAE Paper No. 860390 by Frederick H. Phail and David J. Arnett entitled "In-Vehicle Networking—Serial Data Communication Requirements And Directions"; and SAE Paper No. 860389 by Frederick O. R. Miesterfeld entitled "Chrysler Collision Detection ($C^2D$) A Revolutionary Vehicle Network."

Attention is invited to the previously filed patent applications on related subject matter for a partial description of some of the hardware disclosed in FIG. 1, FIG. 2, FIG. 3 and FIG. 4.

The interaction between the arbitration detector 42, collision detector 44, word counter 202, word flip-flop 203, start bit detector 200, framing error detector 204, idle counter 206, idle flip-flop 207, clock divider 201, digital filter 210, bus driver made up of OR gate 62 and NAN gate 63, along with bus receiver 30 in conjunction with current source 34 and current sink 36 as connected to the bus 26.

An understanding of the above-listed blocks is necessary for understanding the improvements outlined in the subject application. Attention is, therefore, invited to patent applications U.S. Ser. Nos. 832,908 and 832,909 and the explanations included therein and the drawings which all have been incorporated by reference.

Referring now to FIG. 1, FIG. 2, FIG. 3 and FIG. 4, the hardware for the serial data bus is shown.

SCI MODE OF OPERATIONS

The circuit shown in FIG. 1, FIG. 2, FIG. 3 and FIG. 4, used to obtain SCI operation are used for the other modes of operation and are basic to the entire interface IC.

When the start bit detector 200 senses a valid start bit, it causes the word counter 202 to synchronize itself to the timing of the received data word. The word counter 202 is used to generate pulses, one for the collision detector 44 and another for the word flip-flop 203. At ¼ bit time, the word flip-flop 203 clocks the arbitration detector 42. The word counter 202 triggers the framing error detector 204 at the stop bit time. If the stop bit is not detected, the idle counter 206 is extended by the framing error detector 204 until 10 idle periods in a string are received.

The collision detector 44 samples the transmitted input and received output. It is the function of the collision detector 44 to block transmission that could interrupt bus 26 operations. If two or more user microprocessors 22 want to transmit at about the same time, the arbitration detector 42 will allow transmission on a first-come first-serve basis. If the user microprocessors 22 both try to transmit in synchronism, that is within an arbitration window of time, the collision detector 44 will permit only the one with the highest priority to continue transmitting.

When a user microprocessor 22 is connected to the bus 26 and is ready for transmission, it shall use the following procedure. First, the user microprocessor looks at the $\overline{\text{IDLE}}$ line and waits until it goes to a logical zero, indicating that the bus 26 is idle. Then the user microprocessor 22 tries to transmit an 8-bit ID word associated with the data to be transmitted. If the user microprocessor 22 started transmitting first or has the highest priority ID, the collision detector 44 and arbitration detector 42 will permit transmission. The user microprocessor 22 confirms transmission by reading the received ID word by comparing it with the ID it wanted to transmit. If there is a confirmation that the same ID was transmitted, then the data can be transmitted. If not, then the user microprocessor needs to check to see if the received ID and data is needed for its own use.

It is important to realize that data collision may result due to outside interference or a request for arbitration when long data strings are transmitted. The user microprocessor 22 that is transmitting data can compare the transmitted data with the received data for this type of collision. Appropriate action should then be taken by the user microprocessor 22.

The function of the idle counter 206 and idle flip-flop 207 is to detect when the bus 26 is in the idle condition. This is accomplished by sensing a received stop bit. A delay is then imposed for a short idle period of ten bit times. The IDLE output is then set to a logical zero. The IDLE line is set to a logical one by receiving a start bit. This signal is also used to terminate transmission not allowing transmission during a received signal message. The idle counter 206 and idle flip-flop 207 also supply a reset signal to the collision detector 44 at the beginning of an idle period.

A request for arbitration can be generated by a module that needs to interrupt transmission of a long data string. The way this can be accomplished is by forcing the IDLE input to a logical zero; this forces a data collision after transmitting the start bit of the fifth byte, and the transmitting user microprocessor 22 is required to detect this and stop transmitting. It is, however, allowed to again arbitrate for the bus 26, but the interrupting module may not cause a second data collision if it loses arbitration.

In the SCI mode, the bus interface 24 supports a typical full duplex asynchronous serial communications interface for transfer of data bytes to and from a user microprocessor 22.

In addition to the asynchronous data interfaces, the user microprocessor must also have an interface to the bus interface IC 24 for the IDLE line and for control purposes.

In the SCI mode, when a user microprocessor 22 wants to send a message on the bus 26, it sends and receives each byte one at a time and monitors its progress. As the bits of a byte are sent from the transmit line of the SCI port of the user microprocessor 22, they are passed through the bus interface IC 24 and onto the bus 26.

Simultaneously, the bits on the bus 26 are detected by the bus interface IC 24 and passed to the receive line of the user microprocessors 22 SCI port. The user microprocessor 22 compares the received/reflected byte to the last transmitted byte and, if they are equal, the user microprocessor 22 knows that the last byte was transmitted successfully and can go on to process the remaining bytes. When the messages are transmitted on the bus 26 by other user microprocessors 22, the bus interface IC 24 receives then one byte at a time through the receive line of its SCI port.

The user microprocessor 22 must monitor the IDLE line in order to determine when the last byte of a message has been received, when the next received byte will be the first message and when it is arbitration time.

SPI MODE OF OPERATION

In this mode, the word counter 202 generates the timing signals to drive the SCK counter 303 in conjunction with the SCK selector 302 and the start bit detector 200. The user microprocessor 22 becomes a slave to the bus interface IC 24. When the user microprocessor 22 needs to transmit a word, it loads that word into its buffer register and watches for the IDLE pin of the bus interface 24 to go to a logical zero signifying that the bus 26 is idle.

The user microprocessor then pulses the CONTROL pin of the bus interface IC 24. This sets an XMIT ENABLE register within the scheduler and controller 309 to transmit. The bus interface IC 24 will then generate a start pulse and supply the user microprocessor 22 with 8 SCK shift pulses in synchronization with the start pulse. If a collision is detected on the message ID byte by the user microprocessor 22, the user microprocessor 22 stops transmitting immediately and starts receiving. If no collision is detected, this means that the user microprocessor 22 has won arbitration and it, therefore, completes data transmission.

Synchronizer logic works with the SPI clock generator 308 and produces synchronized shift clock pulses for both receiving and transmitting of data. However, it does not output shift pulses for start and stop bits. A very accurate clock is required here to synchronize an established data transmission/reception rate.

In the SPI mode, the bus interface IC 24 supports the SPI type of interface facilities available on some model microprocessors.

With the generally available SPI support, two microprocessor family devices, one a master and the other a slave, interchange at high speed, two bytes of data, one bit at a time, with data synchronization controlled by a clock signal supplied by the master device.

With the bus interface IC 24 in the transmit mode, one byte of data is, one bit at a time, simultaneously transferred to the bus interface IC 24, transmitted onto the bus 26, while a received reflected bit is received from the bus 26 and transferred back to the user microprocessor 22. At the end of a one-byte transmit cycle, the user microprocessor 22 has, in its SPI data register, the byte that reflects the transmission of the byte that was in its SPI data register when the user microprocessor 22 pulled the CONTROL line low to request the beginning of the transmission cycle.

When the bus interface IC 24 begins to receive a byte of data from the bus 26 before the user microprocessor 22 pulls the CONTROL line low, the bus interface IC 24 pulls the CONTROL line low and starts generating the SCK clock signal. As each data bit is received, it is clocked out of the bus interface IC 24 into the user microprocessor 22. Any data in the user microprocessor's SPI data register before the SCK signal starts is transferred out of the data register to nowhere as the received data is transferred into the SPI data register.

In some cases, it may be useful to connect the CONTROL line of the bus interface IC 24 to the SS line of the user microprocessor SPI port as an alternative to other ways of setting the SS low.

There is a slight time delay between the transfer of the bit from the user microprocessor 22 to the bus interface IC 24 on the rising edge of an SCK cycle and the transfer of the bit from the bus interface IC to the user microprocessor on the falling edge of the same SCK cycle.

Data transfers between the user microprocessor 22 and the bus interface IC 24 occur at the bus transfer speed, 7,812.5 bits per second.

SPI mode differs from the SCI mode mainly because of the differences between SPI types of interfaces and SCI types of interfaces. In the SPI mode, the user microprocessor 22 does not have access to the start and stop bits transmitted on the bus 26. In the SPI mode, the user microprocessor must reverse the bit order of transmitted and received bytes.

SPI mode is similar to the SCI mode in that the user microprocessor 22 sends or receives data to and from the bus interface IC 24 one byte at a time. When transmitting a message, each bit of a transmitted byte is simultaneously transmitted onto the bus while the reflected bit is received from the bus 26.

In SPI terms, the user microprocessor 22 operates in the slave mode and the bus interface IC 24 operates as the master.

In functional terms, the user microprocessor 22 in the bus interface IC 24 are on somewhat equal terms with the bus interface IC 24 being more equal than the user microprocessor 22 as both can initiate a data transfer. The user microprocessor 22 can request the transmission of a byte by the bus interface IC 24 by pulling the CONTROL line low, but it has to do so before the bus interface IC 24 begins receiving data from the bus.

As a slave to the bus interface 24, the user microprocessor 22 must be able to handle the use of the SPI port at any time by the bus interface IC 24.

Data is transmitted on the bus 26 in an asynchronous fashion with a start bit, eight data bits and a stop bit. The order of data bits is the least significant bit (LSB), bits 1, 2, 3, 4, 5, 6 and MSB. In an SPI transfer, a user microprocessor 22 normally transfers the MSB first and the LSB last, just the opposite of the bus transmission.

In order to use SPI mode, the user microprocessor 22 must reverse the bit order of all transmitted and received bytes. (This problem does not occur in the buffered SPI mode explained below.)

BUFFERED SPI MODE OF OPERATION

The buffered SPI mode required additional circuits to that used in the SCI and SPI modes. A 16-bit buffer and bit reverser 304 is provided for both receiving and transmitting data. A control flip-flop is used to determine whether the buffer 304 is connected to the user microprocessor 22 or to the bus transmit circuitry.

When powered up, the control flip-flop is connected to the user microprocessor 22. The user microprocessor 22 is the master and the bus interface IC 24 is a slave peripheral. The user microprocessor 22 can be connected to other peripheral ICs and the bus interface IC 24 will be selected by the $\overline{CS}$ pin (chip select not pin). When the user microprocessor 22 wants to transmit, it selects the bus interface IC 24 by outputting a "zero" to the $\overline{CS}$ pin and then watches the CONTROL pin. When the control pin goes to a logical one, signifying that the buffer register 304 is full of received data and can be read by the user microprocessor 22, the user microprocessor 22 then supplies the 16 shift pulses and reads the data at the same time it loads the SPI buffer in block 304 with the ID and data it wants to transmit.

The user microprocessor 22 then pulses the CONTROL pin and the data will be transmitted at the proper time. If the microcomputer just wants to read, it just reads by supplying the shift clocks and does not pulse the CONTROL pin. The bus interface IC 24 contains the circuitry to hold the received data in the buffer register and ignore receiving new data until after the old data has been read. This ensures that the transmitted data can be tested to be sure that it won arbitration; if not, it will need to be re-transmitted.

In the buffered SPI mode, the bus interface IC 24 uses an internal 16-bit shift register called a 16-bit buffer and bit reverser 304, to buffer two bytes of data between the user microprocessor 22 and the bus 26 while supporting the use of the typical SPI type of interface for the transfer of data between the user microprocessor 22 and the bus interface IC 24.

The two byte buffer separates the user microprocessor 22 from the operation of the bus 26. This allows the user microprocessor 22 to concentrate on other higher priority tasks and to have multiple devices on its SPI bus.

The user microprocessor 22 loads the two-byte buffer in the bus interface IC 24 at high speed using an SPI interface and signals the bus interface IC 24 to transmit the data in the buffer.

The bus interface IC 24 at bus speed, attempts to transmit the buffered data to the bus 26. During this attempt to transmit, the bus interface IC 24 receives two bytes of reflected data back from the bus 26, stores them in the buffer and locks the buffer from receiving further data from the bus 26 until the received data is unloaded by the user microprocessor.

Later, the user microprocessor 22, again using the high speed SPI transfer technique, unloads the received bytes and simultaneously loads the next bytes to be transmitted.

While it is transmitting and receiving two bytes of data to and from the bus, the bus interface IC 24 is not transferring data to and from the microprocessor 22 and, in fact, does not need to be chip selected by the user microprocessor 22 during this time.

The user microprocessor uses the $\overline{IDLE}$ and CONTROL line to sense the status the bus interface IC 24 and to control its operation.

The principle differences between the buffered SPI and the unbuffered SPI mode are the use of a two-byte internal buffer, that the user microprocessor 22 operates in master mode instead of slave mode and, the separate rather than combined steps of transferring data between the bus interface IC 24 buffer and the user microprocessor 22, and transmitting/receiving data to/from the bus 26.

Figure 2:
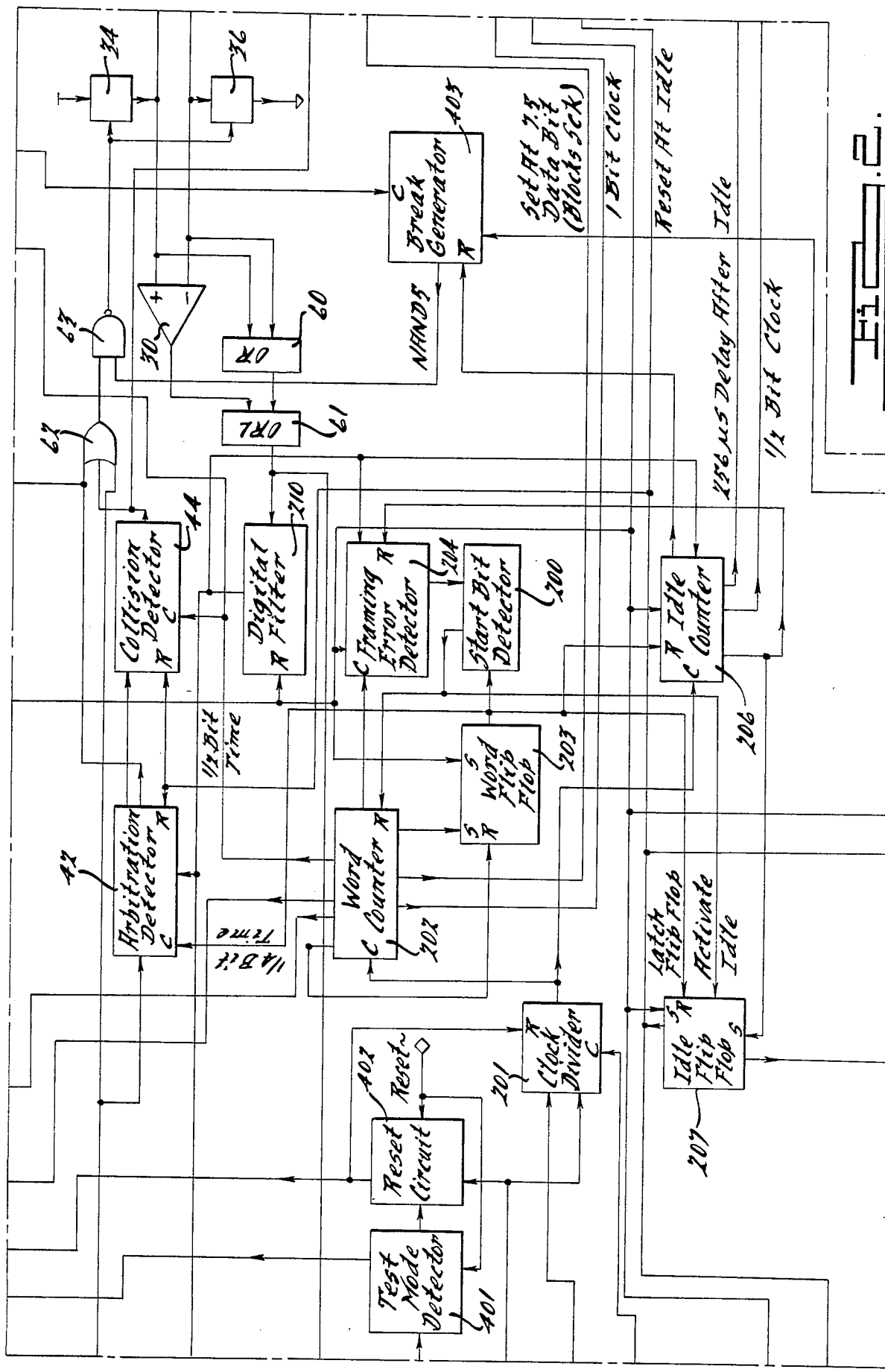
FIG. 2 illustrates the hardware for the serial data bus described herein.
Figure 3:
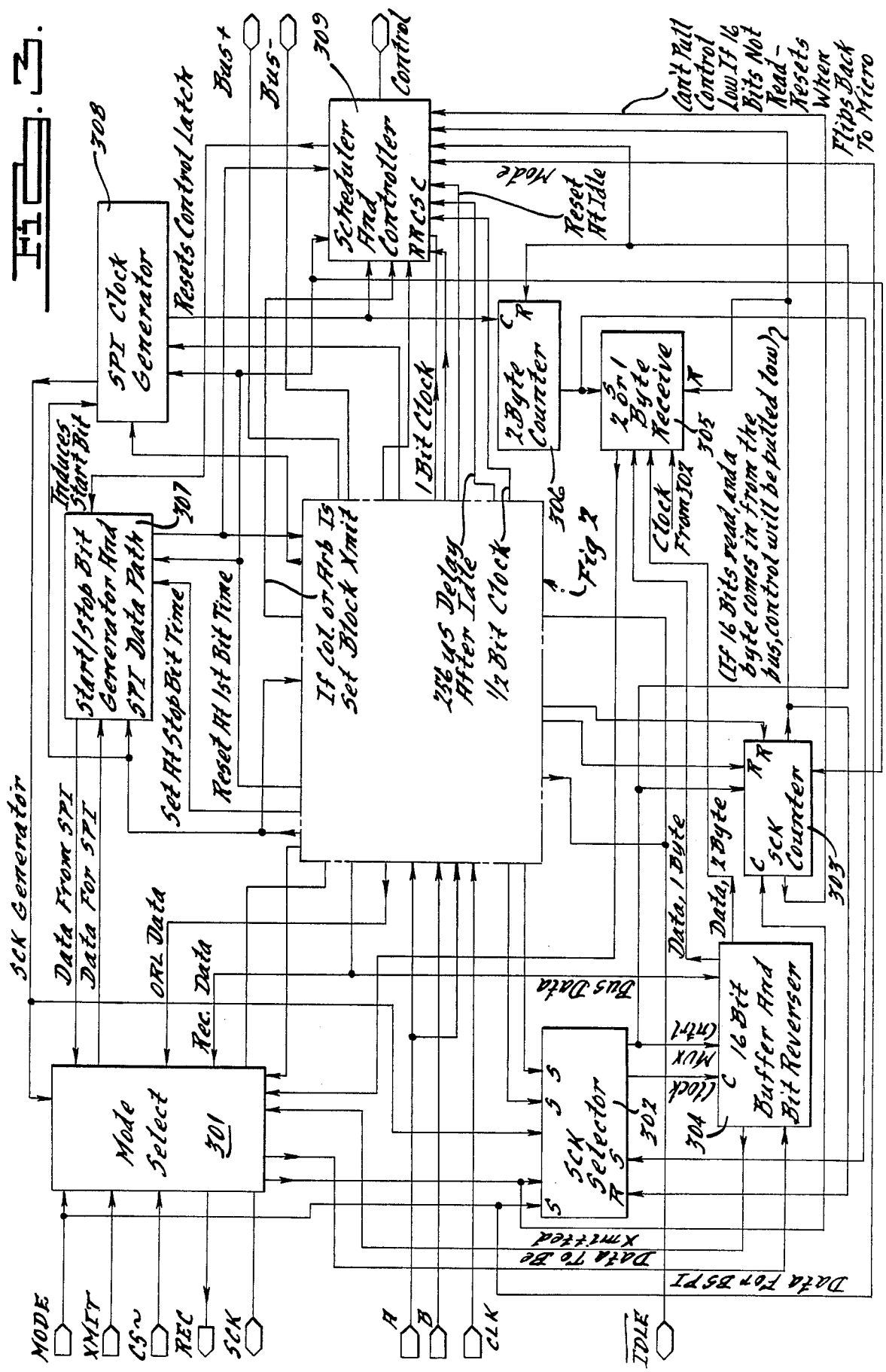
FIG. 3 is a continuation of the hardware drawing for the serial data bus.
Figure 4:
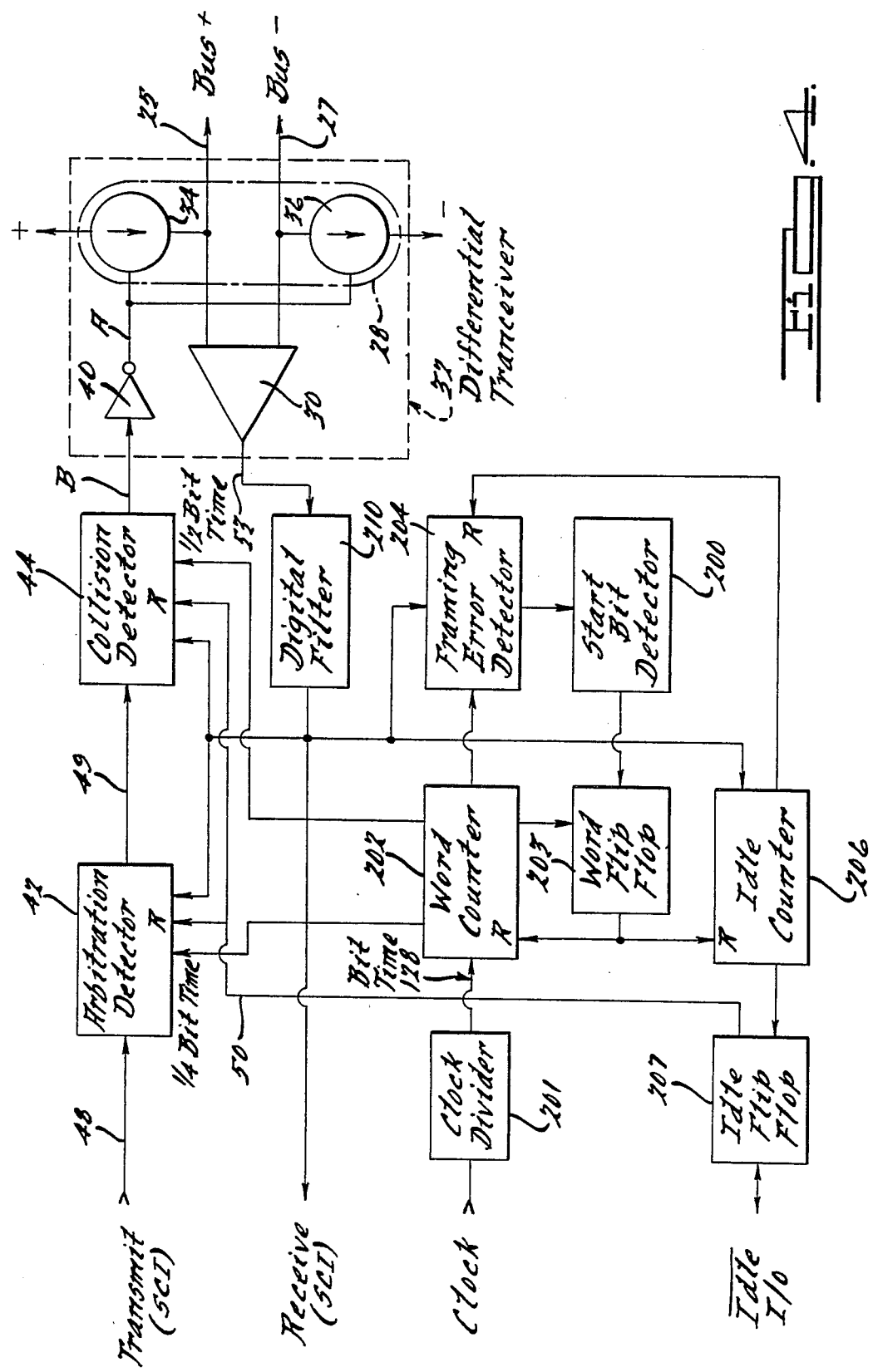
FIG. 4 is a block diagram of the bus interface integrated circuit (IC)

Referring now to FIG. 2 and FIG. 3, the hardware of the bus interface IC will be described.

The mode select block 301 is composed mostly of data multiplexers and gates well known to those who design ICs. The function of the mode select block 301 is to control data and the shift clock (SCK) signal flow into and out of the bus interface IC 24. The MODE and $\overline{CS}$(active low) inputs determine which one of the three modes the bus interface IC is in.

If the MODE and $\overline{CS}$ inputs are a logical one value, the bus interface IC 24 is in the SCI mode. Here data flows from the XMIT (transmit) pin and is gated directly to an output of mode select block 301 to the arbitration detector 42. In addition, the data to be sent to the received data (REC) pin comes into the block 301 from the digital filter 210.

If the MODE input is at a logical one state and the $\overline{CS}$ input is at a logical zero, then the bus interface IC 24 is in the SPI mode. In the SPI mode, data is input to the bus interface IC 24 in a synchronous fashion in which the bus interface IC 24 is the master. When the user microprocessor 22 is transmitting, the SCK output produces rising and falling edges which will induce the user microprocessor 22 to output data on the rising edge and will latch data into its on the falling edge.

The SCK pulses for the SCK pin come into the block 301 from the SPI clock generator 308. Data that comes in from the XMIT pin is sent out to the start/stop bit generator and SPI data path 307 for start and stop bit generation. Data from the start/stop bit generator 307 comes back into the mode select block 301 and is then sent out on an output line to arbitration detector 42. Data for the REC pin from the mode select block 301, while in the SPI mode, comes from the digital filter 210.

If the MODE pin is at a logical zero state, the bus interface IC 24 is in the buffered SPI mode. In this mode, the $\overline{CS}$ input acts as a true chip select.

If the $\overline{CS}$ is a logical zero, the REC pin will be in the active or driving state. If the $\overline{CS}$ input is at a logical one, the REC pin will be in a high impedance state, and any SCK pulses entering the bus interface IC 24 will be blocked.

While in the buffered SPI mode, the user microprocessor 22 is the master, which means that the user microprocessor 22 must supply the SCK pulses. The use microprocessor 22 selects the chip or bus interface IC 24 via the $\overline{CS}$ input and produces 16 SCK pulses, the data associated with these pulses will be put into a 16 bit buffer and bit reverser 304 via mode select 301. The 16-bit buffer and bit reverser 304 is clocked from SCK selector 302.

Data from the XMIT pin flows from that pin out of the mode select block 301 and into the 16-bit buffer and bit reverser 304. While the buffer is being clocked, data intended for the receive pin REC is sent from the buffer via the 2 or 1 byte receive block 305.

The mode select block 301 also supports a test mode facility. This is signal to the block 301 from the test mode detector 401 in combination with the reset circuit 402. The signal will pass the data from the over range latch 61 to the REC pin. REC pin on the mode select block 301. The test mode detector 401 comprises essentially two D flip-flops and two NOR gates.

The test mode detector 401 has a purpose to signal the mode select block 301 to pass data from the over range latch 61 to the REC pin located off the mode select block 301. The test mode detector 301 also allows the user microprocessor 22 to perform a reset.

The test mode condition is entered when the A input to the test mode detector 401 is given two pulses. At the point the two pulses are given, the test mode is in effect and the data from the over range latch 61 is sent to the REC pin directly bypassing the digital filter 210.

The test mode is exited by pulsing the A pin two more times. The test mode detector 401 is also reset on power up.

While in the test mode and when the B pin is put to a logical one, the bus interface IC 24 will enter a reset state. If the B input pin is at a logical zero level, the bus interface IC 24 will not be in reset. This reset circuit 402 also produces a reset upon the power up condition. The 402 reset circuit comprises essentially two NOR gates with an internal reset capability.

The clock divider 201 allows the user microprocessor 22 the capability of having a divide by 10, 8, 4 or 1. The four states of the counter included in the clock divider are determined by the inputs on pin A and pin B. The clock divider 201 is also reset by the reset circuit 402. The clock divider 201 is composed of five D flip-flops, six gates and three data multiplexers.

The arbitration detector 42 comprises essentially the following gates: one D flip-flop and two nand gates. The arbitration detector operates as follows. When a user microprocessor 22 accesses the bus 26, the $\overline{IDLE}$ line of the bus interface IC 24 goes high and the user microprocessor 22 sees this condition and determines that access to the bus 26 is still possible. If the user microprocessor accesses the bus within ¼ bit times, then the arbitration window is not set and the user microprocessor attempting access has a chance to go through the collision detector phase. If the user microprocessor does not get the start bit on the bus 26 within ¼ bit times, then the user microprocessor 22 attempting to access the bus 26 is locked out from the bus 26 until the bus idle condition occurs. This decision is made at the ¼ bit time and is reset by the bus idle line.

Turning now to the collison detector 44, this block is comprised essentially of the following logical elements: one D flip-flop and a nand gate.

The collision detector 44 is clocked at the mid bit time. When the collision detector 44 is clocked, it determines if the user microprocessor 22 was transmitting a one while the bus 26 carried a logical zero state; if so, a latch is set in the collision detector 44 and the bus interface IC 24 is blocked from transmitting onto the bus 26. A logical one at the bus 26 or on the input to the collision detector 44 will not affect the latch and the user microprocessor 22 will continue to have access to the bus 26. The collision detector 44 is reset at the bus idle condition.

The digital filter 210 comprises three flip-flops and two gates to filter for noise. It has two D-type flip-flops connected in a shift register fashion, clocked by the system clock, the Q outputs of the flip-flops go into an AND gate. Also, the $\overline{Q}$ outputs go into a NAND gate. The first NAND gate goes into the set of an RS flip-flop, and the second flip-flop goes into the reset of the RS flip-flop. The result of this is to give a two out of three vote detector. The digital filter 210 takes its input from the over range latch 61, and outputs its data. The digital filter 210 is also held in reset during a reset condition.

The word counter 202 comprises basically twelve D-type flip-flops configured as a ripple counter. The purpose of the word counter 202 is to start counting when a start bit enters from the start bit detector 200. The word counter 202 then provides the timing for the collision detector 44, arbitration detector 42, framing error detector 204 and other SPI timing functions.

The word counter 202 provides the ¼ bit time clock for the word counter 202, the output of which is taken off of the sixth flip-flop in the counter chain.

The collision detector 44 gets its ½ bit time signal from the seventh flip-flop in the counter chain. Also, a signal is decoded from the counter chain to give a signal at the center of the tenth bit (stop bit). This signal, from word counter 202, is used to clock the framing detector circuit 204. A clock cycle delay signal from word counter 202 is used in setting block 203 the word flip-flop. The SPI control outputs from the word counter in block 202 will be covered completely in the respective portions of the bus interface IC 24 in the rest of FIG. 2 and FIG. 3.

The function of the word flip-flop in block 203 is to, after the middle of the tenth bit, or after a reset condition, lock onto a start bit from the start bit detector 200 if the start bit has been in existence for ¼ bit time.

If the start bit, after the middle of the tenth bit, or after reset is less than ¼ bit time, then the word flip-flop 203 will not lock onto a start bit and the word counter 202 is allowed to reset via the start bit detector 200, but if the start bit has been in existence for more than ¼ bit time, the word flip-flop 203 is latched and will not be reset until the middle of the tenth bit (a stop bit). Resetting to the word flip-flop in block 203 is done via an output signal from the word counter 202.

The start bit detector is block 200 is basically a NOR gate and it works in conjunction with the word flip-flop 203.

These two blocks work together after the passing of the middle of the tenth bit or just after a reset. The blocks look for a start bit from the framing error detector 204 and when this start bit appears, the word counter 202 is turned on via the start bit detector 200.

If the start bit remains, the word counter 202 is kept on and, if the start bit has been there for ¼ bit time, then the word flip-flop 203 will be latched and, hence, the word counter 202 will also be latched on via the start bit detector 200.

The start bit detector 200 is a NOR gate with its inputs from the framing error detector 204 and the word flip-flop 203. The output of the start bit detector 200 goes to the reset of the word counter 202 so that either of these two circuits can turn the word counter 202 on. If the start bit is less than ¼ bit time, then the start bit detector 200 turns off the word counter 202. When the start bit detector 200 sees a start bit, idle flip-flop 207 output is activated, thus forcing $\overline{\text{IDLE}}$ to a high level. The framing error detector 204 accepts data from the digital filter 210 and passes its data along to the start bit detector 200. The framing error detector 204 is clocked at the middle of the tenth bit, or the stop bit. If the stop bit bit is a logical one in value, then the stop bit is valid and the data can continue to pass freely through the circuit. But, if the tenth bit is a logical zero, then this is a framing error condition and the framing error detector 204 will lock out any more start bits from entering the start bit detector 200. The effect of this is to keep the word counter 202 in an off or reset condition and leave the idle counter 206 running until the bus 26 has been idle for at least 10 bit times. The framing error detector 204 will be reset at the bus idle time.

The idle counter 206 is similar in construction to the word counter in block 202 and is an 11-bit ripple counter. The idle counter 206 turns on whenever the word flip-flop in block 203 is in a set condition. This occurs after reset or after the middle of the tenth data bit.

The purpose of the idle counter 206 is to count the bit times after a word has been completed. The counter will count up to ten bit times and will reset the idle flip-flop 207 and the framing error detector 204. If, while counting out the idle times, a zero on the bus 26 of less than ¼ bit time appears, the upper four bits of the idle counter 206 will be reset, and the ten bit times will be extended. The bus data, from the digital filter 210 is sampled at ⅛ bit time durations to give some noise immunity to the upper four bits in the idle counter 206. Therefore, the less than ¼ bit time zero value on the bus 26 would have to appear during the ⅛ bit time window in order to reset the upper four bits in the idle counter 206, thus extending the idle time.

The idle flip-flop 207 is comprised of a flip-flop, an AND/NAND gate and a transistor with an active pull up. Its purpose is to signal the bus 26 as busy whenever there is an activity on the bus 26. The idle flip-flop 207 comes up in a set condition after a power on reset. This is then passed through an AND gate. The output of the AND gate drives a transistor. So, when the AND gate is high, the $\overline{\text{IDLE}}$ pin is low and vice-versa. The other input of the AND gate comes from the start bit detector 200.

Assuming that conditions in the bus interface IC 24 are just after a power on reset or a long idle period, greater than 10 bit times, the $\overline{\text{IDLE}}$ pin will be low. As soon as a logical zero is detected on the bus 26, the output of the start bit detector 200 goes low and signals the AND gate to drive the $\overline{\text{IDLE}}$ pin high. Then, if the start bit is deformed by noise or generated by noise and is less than ¼ bit time, the output of the start bit detector 200 will go high and the $\overline{\text{IDLE}}$ output will return low. But when the start bit is more than ¼ bit times in duration, it is probably a valid start bit, and the word flip-flop 203 will latch. This will reset the idle flip-flop 207 and when the output of the idle flip-flop 207 is applied to the AND gate, this will guarantee the output of the AND gate to be a logical zero, thus forcing the $\overline{\text{IDLE}}$ pin high. The bus 26 will signal a busy condition until a signal from the idle counter 206 sets the idle flip-flop, thus forcing the $\overline{\text{IDLE}}$ pin back to a low condition and signaling a bus idle condition. The break generator 403 is intended to allow a user microprocessor 22 to force a zero state on the bus 26. This zero state on the bus 26 is only allowed to be forced on the bus 26 after a user microprocessor has transmitted at least four bytes. At the first data bit of the fifth byte, the break will be enabled. So, if the user microprocessor 22 then pulls down on the idle line, a zero state will be put out onto the bus 26. If the idle is then released, the break generator 403 no longer has an effect on the bus 26. The break generator 403 comprises essentially three D flip-flops and four gates.

The SPI transmit scheduler and controller in block 309 is made up of approximately three D flip-flops, nine gates, a data multiplexer and a transistor with an active pull up. The transmit scheduler and controller in block 309 is used in the SPI and the buffered SPI modes. Its primary function is to control when data from a user microprocessor 22 is put onto the bus 26. When the user microprocessor 22 wants to transmit data, it pulls down on the CONTROL line. In the unbuffered SPI mode, after pulling down on the CONTROL line, the SPI transmit scheduler and controller in block 309 is latched low by the bus interface IC 24. If the CONTROL line which is connected to the block 309 had been pulled low immediately after the $\overline{\text{IDLE}}$ line had gone low, there is a 2-bit time delay inserted before a start bit can go out onto the bus 26. A signal from the idle counter 206 determines 1.5 bit times of the 2-bit time delay. When the 1.5 bit time after idle has been reached, the signal from the idle counter 206 will set a flip-flop in the scheduler and controller 309. This flip-flop is reset at the idle time by a signal from the idle flip-flop in block 207.

Therefore, once this signal is set, and the control pin is low, this action will enable another flip-flop in the scheduler and controller 309 to be set ½ bit time later. This flip-flop is clocked by another signal from the idle counter 206. Once this flip-flop is set in block 309, its output signal is sent to the start/stop generator and SPI data path block in 307 where a start bit is generated. The output of the flip-flop is reset via a signal from the word counter 202 at the end of the start bit time.

If a start bit does come onto the bus 26 and the user microprocessor 22 did not pull the CONTROL line to a low state, then another signal from the word counter 202 clocks the control latch in block 309 and makes the CONTROL line go to a low condition. This happens at the end of a start bit.

Two inputs, one from the arbitration detector 42 and another from the collision detector 44, tell the scheduler and controller in block 309 if there have been any collisions or lost arbitrations and, thus, that no more start bits may be produced by the bus interface IC 24 until the bus idle condition reappears.

The scheduler and controller in block 309 in a buffered SPI mode works essentially the same as in the unbuffered SPI mode described above, but with a few minor exceptions. When the buffered SPI user microprocessor wishes to transmit, it must first load its 16-bit buffer in block 304 with data. Then, it must pull down on the control line and the CONTROL line will be latched low by the bus interface IC 24.

The input to the scheduler and controller 309 from the SCK counter 303 signals the scheduler and controller 309 that if 16 bits have been read and a byte comes in from the data bus 26, then the CONTROL line will be pulled low, when the input signal from the word counter 202 clocks the control latch. This will happen at the end of the start bit time. The determination of whether the 16 bits have been read or not is determined by another signal from the SCK counter 303 as presented to the scheduler and controller 309. If the 16 bits have not been read, the control line will not be pulled to a low condition.

Given that the 16 bits have been read and the user microprocessor pulls on the control line, then the bus interface IC 24 will respond just as in the unbuffered SPI mode, by generating a start bit, clocking 8 data bits onto the bus, followed by a stop bit, a start bit, then 8 more data bits, followed by the stop bit. In the buffered SPI mode, the control line will return high at the end of the ninth bit of the second byte. This is accomplished via a signal from the SPI clock generator 308 as presented to the scheduler controller 309 which clocks the control latch in the scheduler and controller 309.

In the buffered SPI mode, the control line is brought back to a high condition at the end of the ninth bit time. This is accomplished by clocking the control latch via a signal from the start/stop bit generator in the SPI data path block 307 as presented to the scheduler and controller block 309.

The SPI clock generator found in block 308 is made up of a gate and an RS flip-flop and it is used to generate the SCK pulses to the user microprocessor 22 and to the 16-bit buffer bit reverser in block 304.

These pulses are such that a rising edge is given at the beginning of the second bit, which is the first data bit and a falling edge at the middle of the second bit. This continues for eight bit times. That will now be at the middle of the ninth bit.

The main time base for the SCK signal is from the word counter 202 as presented to the SPI clock generator 308. This is a ½ bit time clock.

The SCK output from this block is derived from the ½ bit time clock signal, but the SPI clock generator 308 must block any clock pulses before the end of the start bit. The SCK output from the SPI clock generator 308 is presented both to the mode select block in 301 and to the SCK selector in block 302.

A signal from the word counter 202 and presented to the SPI clock generator 308 is activated at the end of a start bit. This signal, in turn, clears an internal flip-flop in SPI clock generator 308 whose output is the reset for the control latch. Once this signal is clear, the SCK generator signal output from the SPI clock generator 308 begins to clock in the fashion described earlier. The signal is then blocked at the middle of the ninth bit. This is done with another signal from the word counter 202 which blocks the SCK. This signal sets the internal flip-flop of the SPI clock generator 308. As before, this output is the reset control latch signal as presented to the scheduler and controller 309, and is also set at a power on reset.

Turning now to the SPI start/stop bit generator and data path block in 307, this is the block used as a data path for the buffered and unbuffered SPI modes. It comprises essentially one RS flip-flop and two gates.

Usually, data flows freely from the input to block 307 from the mode select block 301 to the output of the block 307 back into the mode select block 301. However, the data is interfered with when a start bit or a stop bit is generated. When the bus interface IC 24 comes up from a power on reset, the signal from the arbitration detector 42 is blocking data from the bus 26. That is, it forces a stop it level onto the bus 26. When a user microprocessor 22 is in the SPI mode and is ready to transmit, the signal from the scheduler and controller 309 to the data path block in 307 induces a start bit onto the bus 26. At the end of the start bit, the input signal from the word counter 202 to the data path block 307 resets an internal flip-flop in block 307, the output of which is sent to the SPI clock generator 308 and to the brake generator 403, thus allowing valid SPI data to enter the bus 26. Data can then pass freely until the input signal from the word counter 202 sets the output signal of the block 307 as presented to the SPI clock generator 308 and the scheduler and controller 309. This, then, will induce a stop bit onto the bus 26 and block any more SPI data. This signal, as presented from the word counter 202, is also labeled "set at stop bit time."

The SCK selector in block 302 is used only during the buffered SPI mode. It comprises a flip-flop, a data multiplexer and a gate. The SCK selector 302 has a function to describe what source is to clock the 16-bit buffer and bit reverser 304. The clocking is done via the output from SCK selector 302 into the 16-bit buffer and bit reverser 304. The clocking can come from one of two sources, either the internally generated SCK signal from the SPI clock generator 308 or the user microprocessor 22, which enters the SCK selector 302 from the mode select block 301.

When the bus interface IC 24 comes off of a power on reset, as signaled from reset circuit 402, or after a two-byte receive signal, as signaled by the 2-byte counter 306, or after a bus idle, as signaled by the idle flip-flop 207, the 16-bit buffer and bit-reverser 304 can be clocked by the user microprocessor 22. When the user microprocessor clocks the 16-bit buffer and bit reverser 304, 16 times via the SCK pin, this enables the user microprocessor to transmit or to receive new data from the bus 26. When the 16 bits have been input, this enables the output from the SCK counter 303 which will go high at the end of the first start bit, because of the signal from the word counter 202 which is a reset at the first bit time.

When the output from the SCK counter 303 is presented to the SCK selector 302, this will determine what clocks the 16-bit buffer and bit reverser 304, via signal MUXCNTRL. When the MUXCNTRL signal from 302 is reset, the 16-bit buffer and bit reverser 304 will be clocked by the bus interface IC 24. When it is set, the user microprocessor 22 will clock the block 304. The MODE input to this block 304 will make the signal shared between one of the outputs of the SCK counter 303 and one of the inputs to the 16-bit buffer and bit reverser 304, always to be in a logical zero condition, so the 16-bit buffer and bit reverser 304 will always be clocked by the user microprocessor 22.

The 16-bit buffer and bit reverser in block 304 is made up of a shift register utilizing 16 flip-flops and 16 data multiplexers. It is connected as a shift register. Two to one multiplexer gates are used to change the feedback path. When a signal from the multiplex control (MUXCNTRL) line of the SCK selector 302 is a logical zero, data in the 16-bit buffer and bit reverser 304 is shifted from the right to the left. Data from the user microprocessor 22 is input to the first flip-flop in the chain in the signal line labeled "data for BSPI."

Data will then flow out of the last flip-flop intended for the REC pin.

When the MUXCNTRL signal from block 302 is a logic one, the data enters the eighth flip-flop from the digital filter 210. Data is then shifted from the eighth bit towards the first bit. The first bit will then pass data to the 16th bit, and the data from the 16th bit is shifted down towards the 9th bit. Data is sent out to the data bus 26 from the 9th flip-flop.

The SCK counter consists of five D flip-flops hooked up as a ripple counter and flip-flops and gates to control the counter. The purpose of the SCK counter is to count the SCK pulses that come in from the user microprocessors 22. This counts the pulses from the signal fed from the mode select block 301.

Upon power up, the SCK counter 303 is reset. When the user microprocessor 22 counts, a five-stage ripple counter counts the number of SCK Pulses that enter. When the number hits 16, the last counter in the stage is latched and its outputs goes to a logical one and is presented to the scheduler and controller in block 309.

When the user microprocessor 22 begins to transmit and the input signal NQSFF8 goes from a logic zero to a logic one, this, too, will reset the SCK counter. An output from the SCK counter 303 resets the signal NQSFF8; it also drops the control pin to a low state during the buffered SPI mode if a start bit comes in from the bus 26, if the user microprocessor has read 16 bits from the bus 26.

The two or one byte receive block in 305 is basically an RS flip-flop and a data multiplexer. Its function is to distinguish between a two byte receive signal and a one byte receive signal. This is done because typically most messages are at least two bytes. If so, the user microprocessor 22 will go out and receive the two bytes, and the bus interface IC 24 will have its 16 bits buffer and bit reverser 24 full, and the first byte is clocked out first and the second byte second. If, however, the bus interface IC 24 receives only a one byte message, then there is only one good byte sitting in the block 304. What will happen is that the first byte to be clocked out of the 16-bit buffer and bit reverser 304 will be the bad byte and the next byte will be the received byte. To correct this, we added a circuit to detect a one byte or two byte receive. When the transmission begins, the block 305 is reset by an output signal from the SCK counter 303 which produces a default one byte receive. If, after transmission, two bytes were received, the block will be set by the two byte counter in block 306.

If there was a one byte receive, then data will be sent to the receive pin from the middle of the 16-bit buffer and reverser 304. If there was a two byte receive, data will be sent to the receive pin from the end of the buffer in block 304.

The two byte counter 306 is essentially made up of two flip-flops and a NOR gate to count bytes. The function of the block is to count up to two receive bytes. The two byte counter is clocked via the output from the arbitration detector 42. The clocking takes place at the middle of the ninth bit, which is the the eighth data bit.

This counter serves two purposes, when it counts up to two, it will switch the SCK selector 302 from being clocked by the bus interface IC 24 to being clocked by the user microprocessor 22. This is done via the output directly connecting the two byte counter 306 with the two or one byte receive block in 305. This same signal also sets the flip-flop internal to block 305 after a one byte receive. The over range detector found in block 60 is used to detect when the bus 26 goes above 3.13 volts or below 1.8 volts. This is known as an over range condition and the output signal from this block goes high. When the inputs to the block are both below 3.13 volts, and above 1.8 volts, then there is no over range condition and the output of the block is low. The block is essentially a detector that is internal to the I/O cell.

The over range latch (ORL) found in block 61 is essentially a D latch. When an over range latch condition is detected in block 60, the over range detector 60 will signal the over range latch in block 61 which will latch on the last valid piece of data before the over range condition. When there is no over range condition, data has passed freely from the block 60 through block 61 and out to the digital filter 210.

The three input OR gate, shown as block 62, is used in conjunction with the collision detector 44 and arbitration detector 42 and multiplexed output from mode select block 301, which is the transmitted data. If either of the detectors is set, the output of the gate is a constant one value. Thus, when passed through block 63, this will force a zero. This will not turn on the current sources in block 34 and 36 and, thusly, the bus interface IC 24 will not transmit onto the bus 26. If the detectors 44 and 42 are not set on the data from the multiplexed output of the mode select 301, will pass freely into the NAND gate in block 63 and will be transmitted onto the bus 26.

The two input NAND gate shown as block 63 will transmit data from either the block 62 or from the break generator in block 403. When either input is a logical zero, the output of the NAND will be a logical one, thus turning on the current sources in blocks 34 and 36.

The bus plus current source shown in block 34 is turned off and has no effect on the bus plus line when the input to the block is a logical zero. When input to the block is a logical one, the current source 34 is turned on. When the source is on, current is passed from $V_{CC}$ to the bus plus line.

The bus minus current source in block 36 is turned off and has no effect on the bus minus line when the input to the block is a logical zero. When the input to this block is a logical one, the current source is turned on and the current is passed from the bus minus line to ground.

Figure 5:
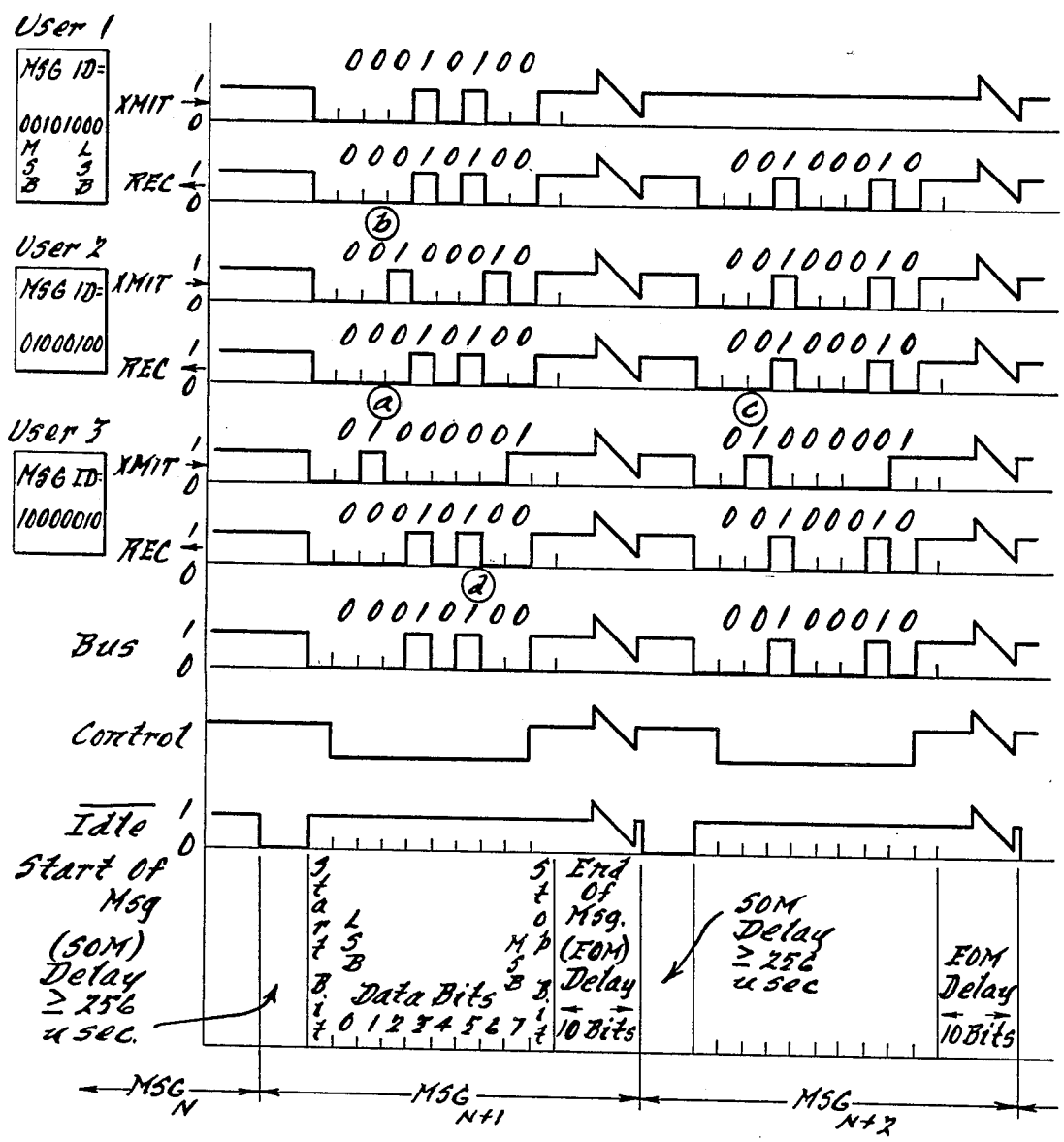
FIG. 5 is a timing diagram showing an example of the collision detection on the bus interface IC during arbitration.
Figure 6:
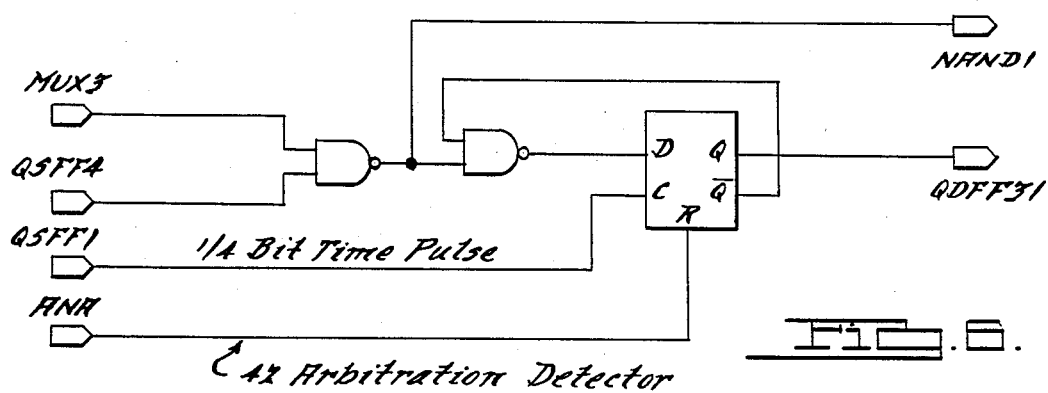
FIG. 6 is a gate diagram of the arbitration detector 42.
Figure 7:
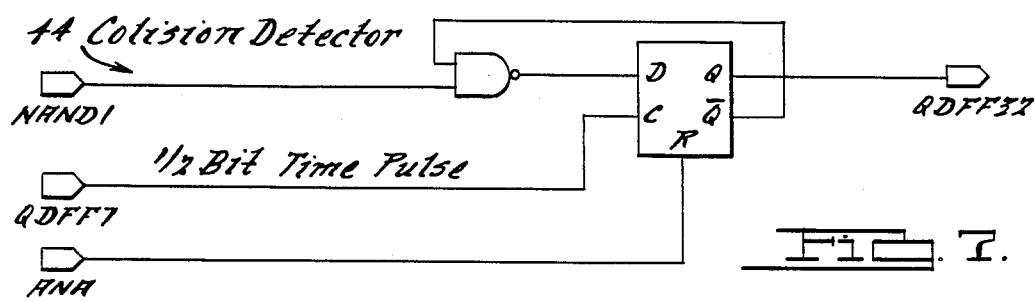
FIG. 7 is a gate diagram of the collision detector 44.
Figure 8:
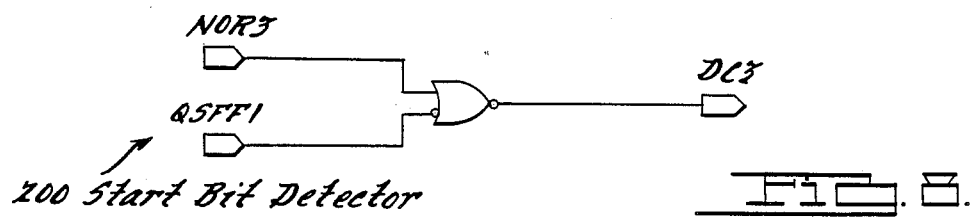
FIG. 8 is a gate diagram of the start bit detector 200.
Figure 11:
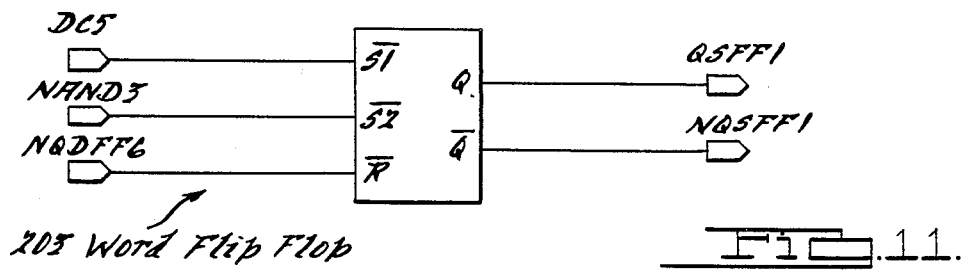
FIG. 11 is a gate diagram of a flip-flop 203.
Figure 12:
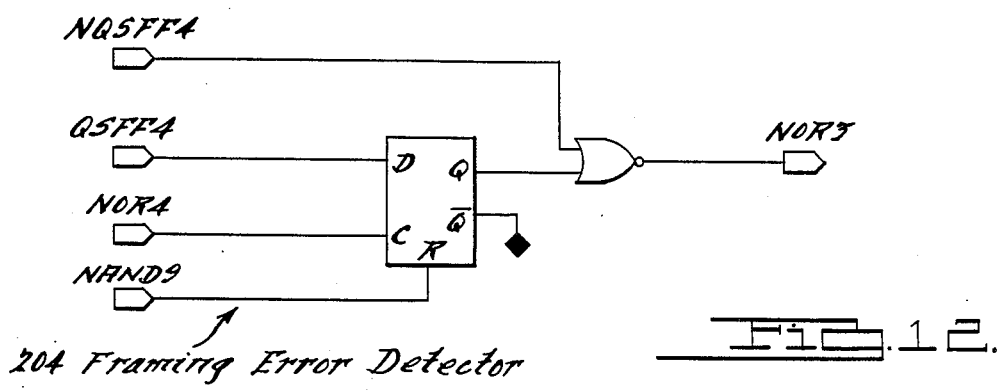
FIG. 12 is a gate diagram of framing error detector 204.
Figure 10:
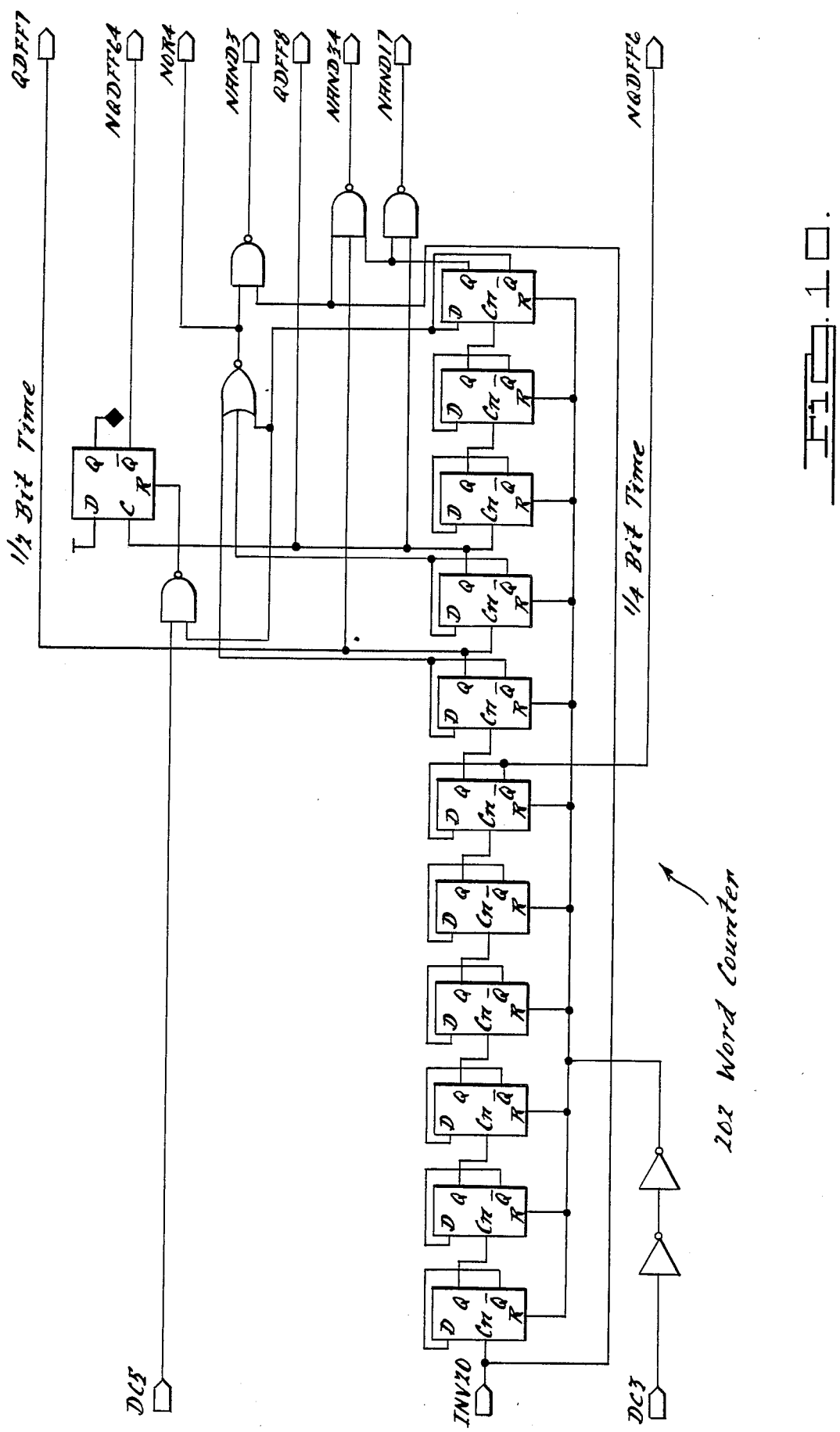
FIG. 10 is a gate diagram of a word counter 202.
Figure 14:
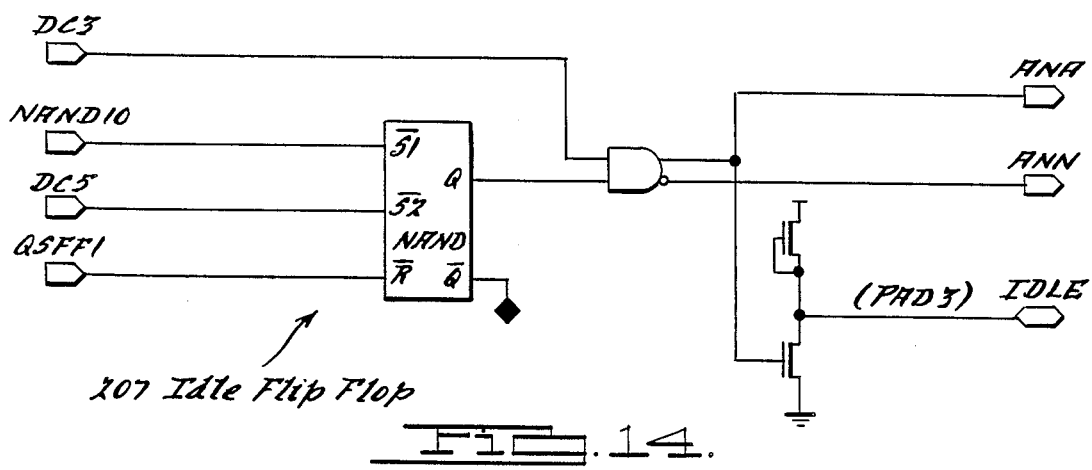
FIG. 14 is a gate diagram of idle flip-flop 207.
Figure 17:
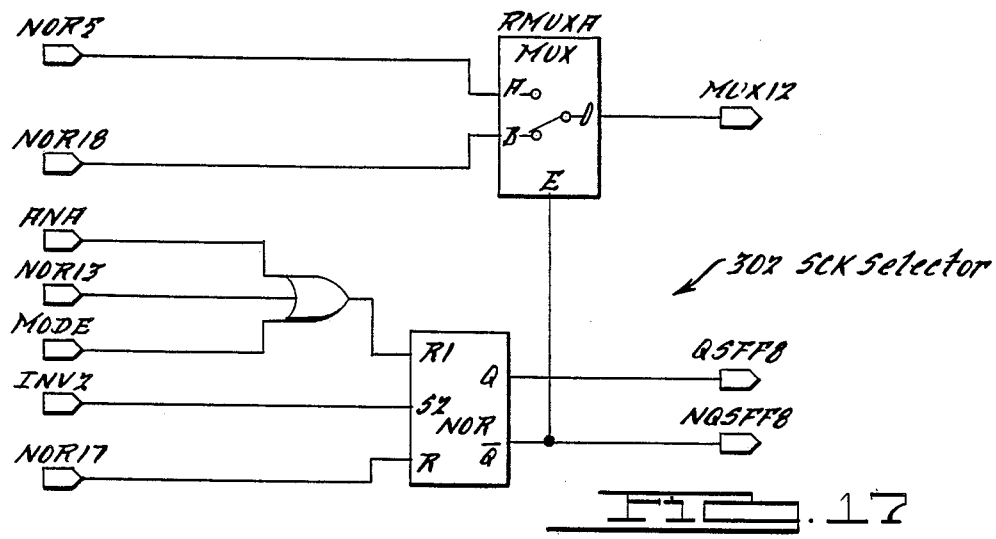
FIG. 17 is a gate diagram of SCK selector 302.
Figure 18:
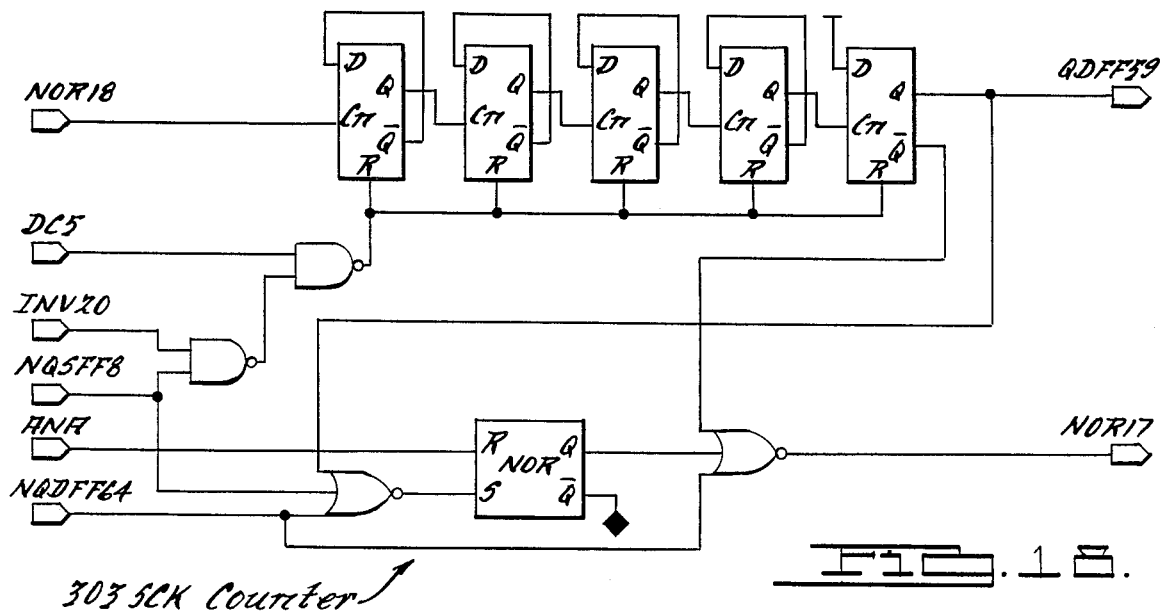
FIG. 18 is a gate diagram of SCK counter 303.
Figures 15, 16:
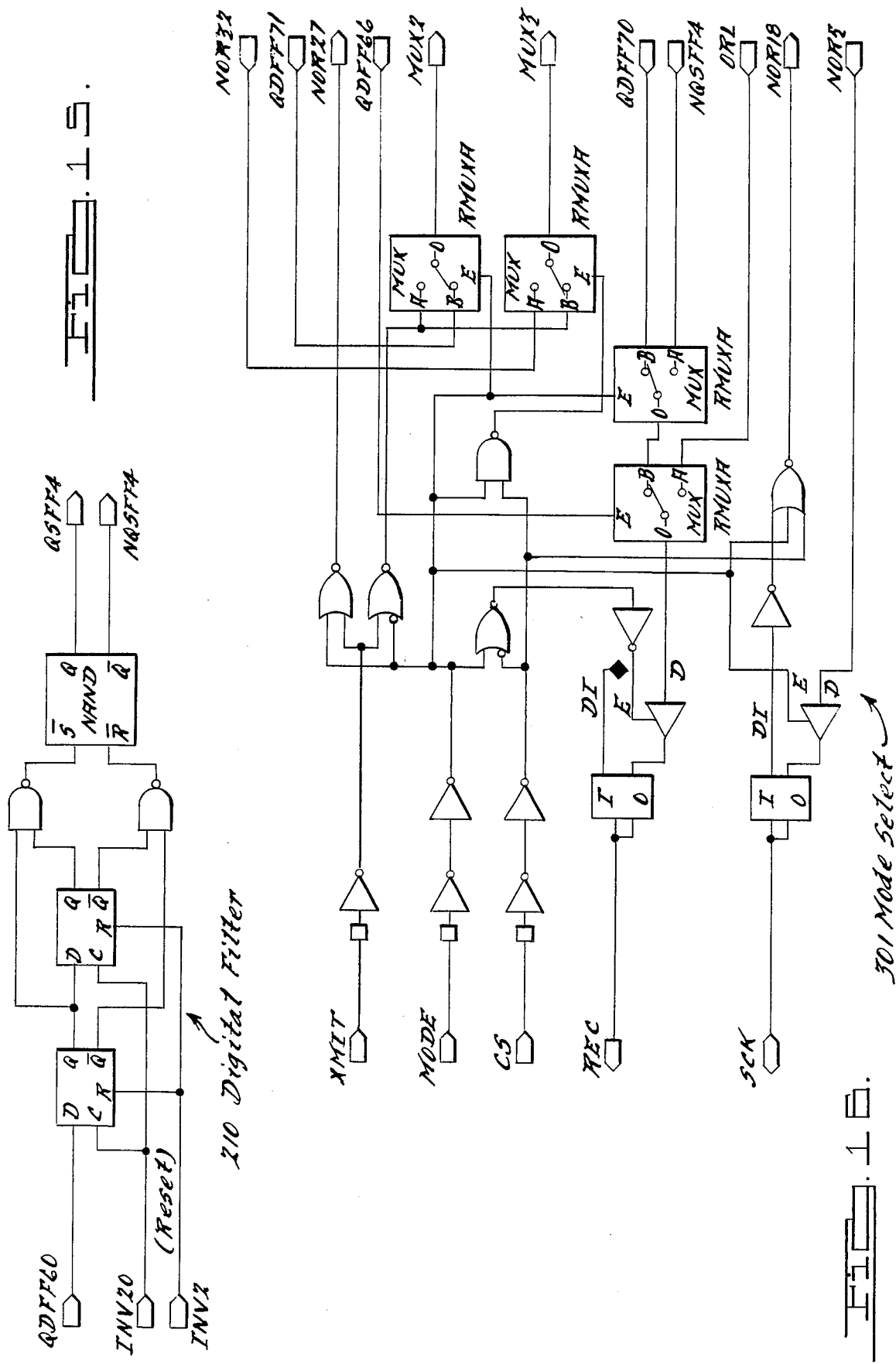
FIG. 15 is a gate diagram of digital filter 210.
FIG. 16 is a gate diagram of mode selector 301.
Figure 24:
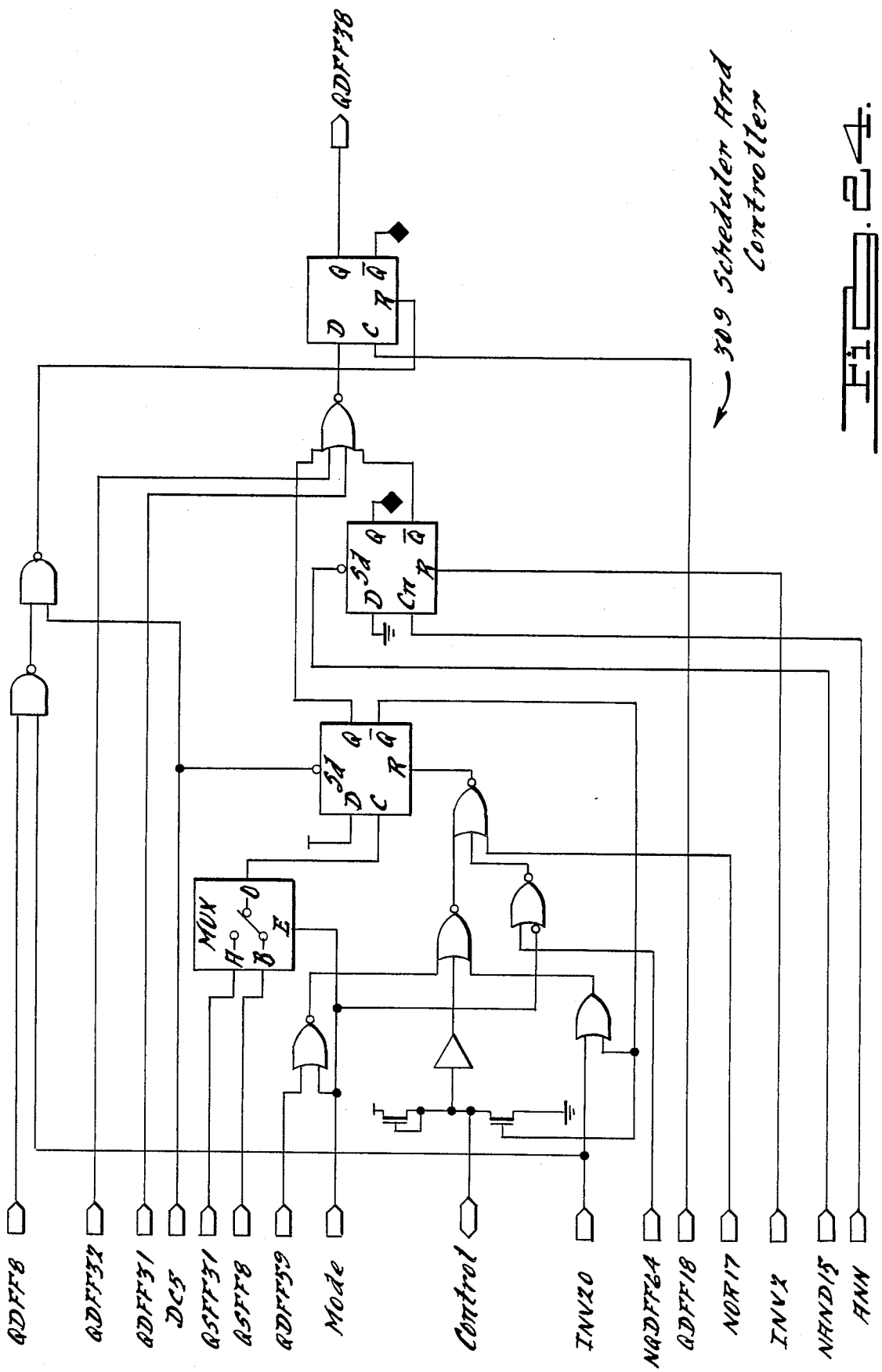
FIG. 24 is a gate diagram of SPI transmit scheduler and controller 309.
Figure 25:
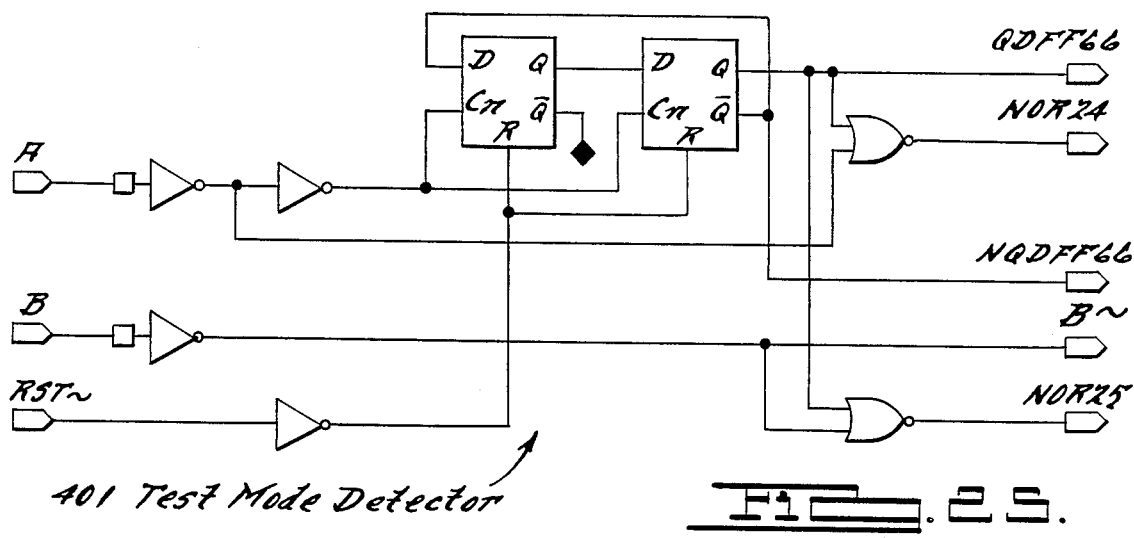
FIG. 25 is a gate diagram of test mode detector 401.
Figure 26:
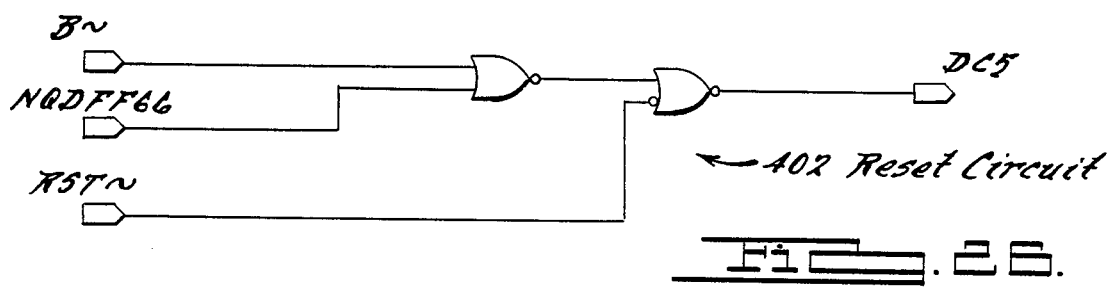
FIG. 26 is a gate diagram of reset circuit 402.
Figure 27:
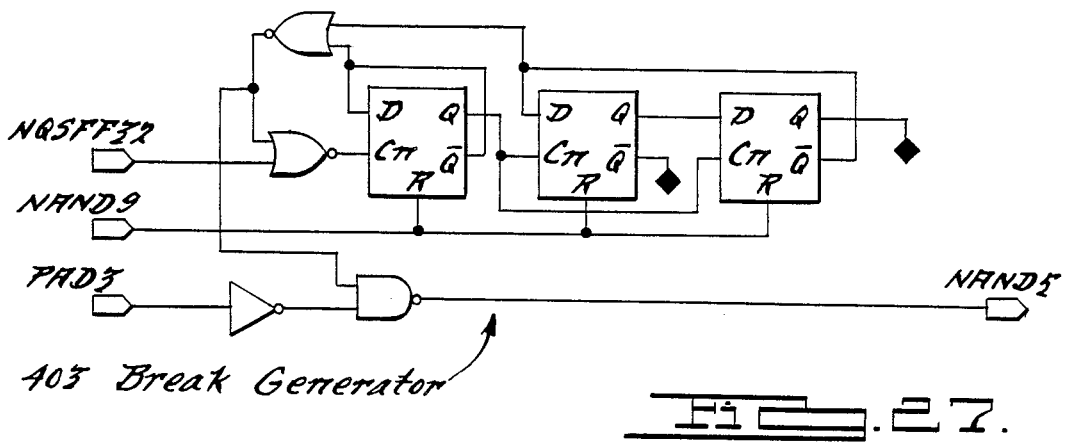
FIG. 27 is a gate diagram of break generator 403.
Figure 28:
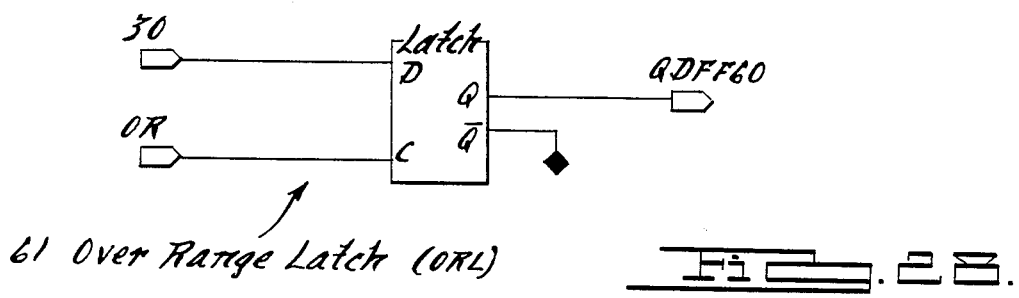
FIG. 28 is a gate diagram of an over range latch.

FIG. 5 illustrates an example of the collision detection on the bus interface IC including the CONTROL signal.

FIG. 6 through FIG. 28 are gate diagrams of the blocks shown in the block diagrams.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

We claim:

1. A communication system for the transmission of data messages through a data bus between two or more user microprocessors coupled to the data bus, the user microprocessors having any one of the following interface ports; a serial communications interface (SCI) port, a serial peripheral interface (SPI) port or a buffered serial peripheral interface (BSPI) port along with a clock port and an input/output port, the user microprocessors being coupled to the data bus by a bus interface integrated circuit, the bus interface integrated circuit comprising:
   a reset circuit;
   an arbitration detector;
   a buffer;
   a collision detector;
   a bus driver;
   a bus receiver;
   an idle detector;
   a series circuit formed by the connection of the arbitration detector, collision detector and bus driver connected between the interface port of the user microprocessor and the data bus to transmit data from the user microprocessor to the data bus;
   the bus receiver connected between the data bus and the interface port of the user microprocessor to receive data messages from the data bus to the user microprocessor;
   the idle detector comprising an idle counter and idle flip-flop connected betwen the input/output port of the user microprocessor and individually to the arbitration detector and collision detector to monitor the data bus and detect when the data bus is idle and when the data bus is busy;
   a digital filter connected between the bus receiver and the SCI Port of the user microprocessor to filter out noise from the data messages before being processed by other parts of the bus interface integrated circuit;
   timing and synchronizing means to establish synchronizing and a baud rate timing signal for use by the arbitration detector, collision detector and idle detector comprising:
   a start/stop bit generator to generate start and stop bits;
   a clock divider to receive a clock pulse from the user microprocessor to generate a clock signal;
   a word counter to accept the clock signal and present timing and synchronizing information to the arbitration detector and to the collision detector;
   a start bit detector to count and indicate when a start bit signal and level is present on the data bus;
   a framing error detector to indicate when the stop bit level is not on the data bus at stop bit time;
   the idle detector to monitor and indicate when the data bus is in an idle condition;
   the bus interface integrated circuit being able to receive data from a user microprocessor configured for data communications in SCI, SPI or BSPI modes the bus interface integrated circuit further comprising:
   a mode select circuit for controlling data and shift clock (SCK) signal flow into and out of the bus interface integrated circuit by responding to the particular interface of the user microprocessor and operating in accordance with that interface, SCI, SPI or BSPI;
   an SCK selector for directing data in the buffered SPI mode and for describing the source of the clock signal for the buffer;
   an SCK counter to count SCK pulses from the user microprocessor;
   a byte counter for counting the number of bytes received;
   an SPI clock generator to generate SCK pulses to the user microprocessor and buffer;
   an SPI transmit scheduler and controller to control when data from a user microprocessor is put onto the bus in the SPI or BSPI modes; and
   a current source and a current sink to drive the logical condition of the bus in response to signals from the bus driver and the bus receiver of the bus interface integrated circuit associated with each user microprocessor on the bus.

2. The bus interface integrated circuit of claim 1 further comprising:
   a break generator to allow a user microprocessor to force a logical condition onto the bus.

3. The bus interface integrated circuit of claim 1 further comprising:
   an over range latch and over range detector to detect when the voltage on the bus deviates from a predetermined voltage window and to indicate the deviation when it occurs.

4. The bus interface integrated circuit of claim 3 further comprising:
   a test mode detector to signal the mode select circuit to pass data from the over range latch to the user microprocessor and to allow the user microprocessor to call for a reset.

5. A communication system for the transmission of data messages through a data bus between two or more user microprocessors coupled to the data bus, the user microprocessors having an interface port of the types: a serial communications interface (SCI) port or a serial peripheral interface (SPI) port along with a clock port and an input/output port, the user microprocessors being coupled to the data bus by a bus interface integrated circuit, the bus interface integrated circuit comprising:
   an arbitration detector;
   a collision detector;
   a start/stop/shift clock (SCK) generator;
   a bus driver;
   a bus receiver;
   and an idle and control detector;
   a series circuit formed by the connection of the start/stop/SCK generator, the arbitration detector, collision detector and bus driver connected between the interface port of the user microprocessor and the data bus to transmit data from the user microprocessor to the data bus;

the bus receiver connected between the data bus and the interface port of the user microprocessor to receive data messages from the data bus to the user microprocessor;

the idle and control detector connected between the input/output port of the user microprocessor and individually to the arbitration detector and collision detector to monitor the data bus and detect when the data bus is idle and when the data bus is busy.

6. The bus interface integrated circuit of claim 5 further comprising:

a digital filter connected between the bus receiver and the SCI port of the user microprocessor to filter out noise from the data messages before being processed by other parts of the bus interface integrated circuit;

timing and synchronizing means to establish synchronizing and a baud rate timing signal for use by the arbitration detector, collision detector and idle detector comprising:

a clock divider to receive a clock pulse from the user microprocessor to generate a clock signal;

a word counter to accept the clock signal and present timing and synchronizing information to the arbitration detector and to the collision detector;

a start bit detector to indicate when a start bit signal and level is present on the data bus;

a framing error detector to indicate when the stop bit level is not on the data bus at stop bit time;

an idle detector to monitor and indicate when the data bus is in an idle condition.

7. A communication system for the transmission of data messages through a data bus between two or more user microprocessors coupled to the data bus, the user microprocessors having an interface port of the types: a serial communications interface (SCI) port, a serial peripheral interface (SPI) port or a BSPI port along with a clock port and an input/output port, the user microprocessors being coupled to the data bus by a bus interface integrated circuit, the bus interface integrated circuit comprising:

an arbitration detector;
a collision detector;
a start/stop/SCK generator;
a bus driver;
a bus receiver;
a buffer;
and an idle and control detector;

a series circuit formed by the connection of the buffer, the start/stop/SCK generator, the arbitration detector, collision detector and bus driver connected between the interface port of the user microprocessor and the data bus to transmit data from the user microprocessor to the data bus;

the bus receiver connected between the data bus and the interface port of the user microprocessor to receive data messages from the data bus to the user microprocessor;

the idle and control detector connected between the input/output port of the user microprocessor and individually to the arbitration detector and collision detector to monitor the data bus and detect when the data bus is idle and when the data bus is busy.

8. The bus interface integrated circuit of claim 7 further comprising:

a digital filter connected between the bus receiver and the SCI port of the user microprocessor to filter out noise from the data messages before being processed by other parts of the bus interface integrated circuit;

timing and synchronizing means to establish synchronizing and a baud rate timing signal for use by the arbitration detector, collision detector and idle detector comprising:

a clock divider to receive a clock pulse from the user microprocessor to generate a clock signal;

a word counter to accept the clock signal and present timing and synchronizing information to the arbitration detector and to the collision detector;

a start bit detector to indicate when a start bit signal and level is present on the data bus;

a framing error detector to indicate when a stop level is not on the data bus at stop bit time;

an idle detector to monitor and indicate when the data bus is in an idle condition.

* * * * *